United States Patent
Shattil

(10) Patent No.: US 10,797,766 B1
(45) Date of Patent: *Oct. 6, 2020

(54) DISTRIBUTED RADIO SYSTEM

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,659

(22) Filed: Feb. 2, 2020

Related U.S. Application Data

(63) Continuation of application No. 16/393,877, filed on Apr. 24, 2019, now Pat. No. 10,637,544.

(60) Provisional application No. 62/662,140, filed on Apr. 24, 2018.

(51) Int. Cl.
| | |
|---|---|
| *H04B 7/02* | (2018.01) |
| *H04B 7/0452* | (2017.01) |
| *H04B 7/06* | (2006.01) |
| *H04B 7/0456* | (2017.01) |
| *H04W 72/04* | (2009.01) |
| *H04B 7/026* | (2017.01) |

(52) U.S. Cl.
CPC .......... *H04B 7/0452* (2013.01); *H04B 7/026* (2013.01); *H04B 7/0473* (2013.01); *H04B 7/0691* (2013.01); *H04W 72/046* (2013.01)

(58) Field of Classification Search
CPC .... H04B 7/0452; H04B 7/026; H04B 7/0473; H04B 7/0691; H04W 72/046

USPC ........................................................ 375/267
See application file for complete search history.

(56) References Cited

U.S. PATENT DOCUMENTS

| | | |
|---|---|---|
| 5,955,992 A | 9/1999 | Shattil |
| 6,686,879 B2 | 2/2004 | Shattil |
| 7,010,048 B1 | 3/2006 | Shattil |
| 7,076,168 B1 | 7/2006 | Shattil |
| 7,286,604 B2 | 10/2007 | Shattil |
| 7,317,750 B2 | 1/2008 | Shattil |
| 7,391,804 B2 | 6/2008 | Shattil |
| 7,406,261 B2 | 7/2008 | Shattil |

(Continued)

OTHER PUBLICATIONS

H. Prakash, C.D.Suriyakala; "PAPR Reduction in MIMO SC-FDMA—A Survey"; Int. J Rec. Adv. Sci. Tech., 2015; 2(2):11-19.

(Continued)

*Primary Examiner* — Helene E Tayong
(74) *Attorney, Agent, or Firm* — Steven J Shattil

(57) ABSTRACT

Systems, methods, computer program products, and devices reduce computational processing performed by at least one computer processor that computes an eigensystem from a first data set; computes updated eigenvalues that approximate an eigensystem of at least a second data set based on the eigensystem of the first data set; and evaluates a plurality of features in each of the first and at least second data sets using a cost function; wherein reducing the computational processing of the at least one computer processor is achieved by at least one of selecting the cost function to comprise fewer than the total number of eigenvalues and employing a coarse approximation of the eigenvalues to de-select at least one of the data sets. This is especially useful for learning and/or online processing in an artificial neural network.

21 Claims, 11 Drawing Sheets

(56) References Cited

U.S. PATENT DOCUMENTS

| | | | |
|---|---|---|---|
| 7,418,043 | B2 | 8/2008 | Shattil |
| 7,430,257 | B1 | 9/2008 | Shattil |
| 7,787,514 | B2 | 8/2010 | Shattil |
| 8,670,390 | B2 | 3/2014 | Shattil |
| 8,677,050 | B2 * | 3/2014 | Chen .................. G06F 12/0895 711/3 |
| 8,885,628 | B2 | 10/2014 | Palanki et al. |
| 8,929,550 | B2 | 1/2015 | Shattil |
| 8,942,082 | B2 | 1/2015 | Shattil |
| 9,225,471 | B2 | 12/2015 | Shattil |
| 9,485,063 | B2 | 11/2016 | Shattil |
| 9,628,231 | B2 | 4/2017 | Shattil |
| 9,693,339 | B2 | 6/2017 | Palanki et al. |
| 9,798,329 | B2 | 10/2017 | Shattil |
| 2005/0265293 | A1 | 12/2005 | Ro et al. |
| 2006/0034378 | A1 | 2/2006 | Lindskog et al. |
| 2006/0245346 | A1 | 11/2006 | Bar-Ness et al. |
| 2006/0262870 | A1 | 11/2006 | Khan |
| 2007/0183386 | A1 | 8/2007 | Muharemovic et al. |
| 2007/0211807 | A1 | 9/2007 | Han et al. |
| 2008/0095121 | A1 | 4/2008 | Shattil |
| 2009/0147870 | A1 | 6/2009 | Lin et al. |
| 2009/0274103 | A1 | 11/2009 | Yang et al. |
| 2009/0304108 | A1 | 12/2009 | Kwon et al. |
| 2010/0110875 | A1 | 5/2010 | No et al. |
| 2010/0165829 | A1 | 7/2010 | Narasimha et al. |
| 2011/0096658 | A1 | 4/2011 | Yang et al. |
| 2011/0150325 | A1 * | 6/2011 | Hill ....................... G06K 9/6298 382/159 |
| 2011/0206207 | A1 | 8/2011 | Priotti |
| 2011/0281534 | A1 | 11/2011 | Liao et al. |
| 2012/0224517 | A1 | 9/2012 | Yun et al. |
| 2012/0294346 | A1 | 11/2012 | Kolze |
| 2014/0198863 | A1 | 7/2014 | Terry |
| 2015/0103723 | A1 | 4/2015 | Kim et al. |
| 2015/0195840 | A1 | 7/2015 | Ahn et al. |
| 2015/0271000 | A1 | 9/2015 | Yang et al. |
| 2015/0304153 | A1 | 10/2015 | Moffatt et al. |
| 2015/0358190 | A1 | 12/2015 | Kruglick et al. |
| 2016/0050096 | A1 | 2/2016 | DelMarco |
| 2016/0050099 | A1 | 2/2016 | Siohan et al. |
| 2016/0142117 | A1 | 5/2016 | Rahman et al. |
| 2016/0197756 | A1 | 7/2016 | Mestdagh et al. |
| 2016/0254889 | A1 | 9/2016 | Shattil |
| 2016/0269083 | A1 | 9/2016 | Porat et al. |
| 2016/0344497 | A1 | 11/2016 | Myung et al. |
| 2016/0352012 | A1 | 12/2016 | Foo |
| 2016/0353446 | A1 | 12/2016 | Abdoli et al. |
| 2017/0019284 | A1 | 1/2017 | Ankarali et al. |
| 2017/0126454 | A1 | 5/2017 | Huan et al. |
| 2017/0134202 | A1 | 5/2017 | Baligh et al. |
| 2017/0134235 | A1 | 5/2017 | Wu et al. |
| 2017/0250848 | A1 | 8/2017 | Lee et al. |
| 2017/0264474 | A1 | 9/2017 | He et al. |
| 2017/0279648 | A1 | 9/2017 | Song et al. |
| 2017/0353340 | A1 | 12/2017 | Raphaeli et al. |
| 2018/0062904 | A1 | 3/2018 | Hwang et al. |
| 2018/0091338 | A1 | 3/2018 | Mayer et al. |
| 2018/0109408 | A1 | 4/2018 | Sandell et al. |
| 2018/0167244 | A1 | 6/2018 | Cheng et al. |
| 2018/0191543 | A1 | 7/2018 | Park et al. |
| 2018/0212810 | A1 | 7/2018 | Park et al. |

OTHER PUBLICATIONS

E. Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.

J. Shin, B. Seo; "PAPR Reduction Scheme for MISO and MIMO OFDM Systems with Limited Feedback"; WSEAS Transactions on Communications 13:355-362—Jan. 2014.

D. Sinanovic, et al.; "Low PAPR Spatial Modulation for SC-FDMA"; IEEE Transactions on Vehicular Technology; vol. 66, Issue: 1, Jan. 2017.

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.

M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.

M. Vu, A. Paulraj; "MIMO Wireless Linear Precoding"; IEEE Signal Processing Magazine. Submitted Feb. 2006, revised Nov. 2006 and Dec. 2006.

H.G. Myung, et al.; "Peak Power Characteristics of Single Carrier FDMA MIMO Precoding System"; 2007 IEEE 66th Vehicular Technology Conference, Sep. 30-Oct. 3, 2007.

B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.

A.S. Parihar, A. Rai; "A Review: PAPR Reduction Techniques in MIMO OFDM System"; International Journal of Engineering and Innovative Technology (IJEIT); vol. 4, Issue 12, Jun. 2015.

B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).

C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.

K Mhatre, U.P. Khot; "Efficient Selective Mapping PAPR Reduction Technique"; International Conference on Advanced Computing Technologies and Applications (ICACTA-2015); Procedia Computer Science 45 ( 2015) 620-627.

K. Srinivasarao, et al.; "Peak-to-Average Power Reduction in MIMO-OFDM Systems Using Sub-Optimal Algorithm"; International Journal of Distributed and Parallel Systems (IJDPS) vol. 3, No. 3, May 2012.

K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.

H. Zhang, D.L. Goeckel; "Peak Power Reduction in Closed-Loop MIMO-OFDM Systems via Mode Reservation"; IEEE Communications Letters, vol. 11, No. 7, Jul. 2007.

C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.

P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.

H-B Jeon, et al.; "Bit-Based SLM Schemes for PAPR Reduction in QAM Modulated OFDM Signals"; IEEE Transactions on Broadcasting, vol. 55, No. 3, Sep. 2009.

H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.

S-J Heo, et al.; "A Modified SLM Scheme With Low Complexity for PAPR Reduction of OFDM Systems"; IEEE Transactions on Broadcasting, vol. 53, No. 4, Dec. 2007.

M.I. Abdullah, et al.; "Comparative Study of PAPR Reduction Techniques in OFDM"; ARPN Journal of Systems and Software; vol. 1, No. 8, Nov. 2011.

E. Abdullah, et al.; "Modified selective mapping scheme with low complexity for minimizing high peakaverage power ratio in orthogonal frequency division multiplexing system"; AIP Conference Proceedings 1774, 050005 (2016).

S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.

P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.

(56) References Cited

OTHER PUBLICATIONS

D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.

B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.

C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.

C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.

B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.

Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.

S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.

B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.

Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.

B. Natarajan, C.R. Nassar, S. Shattil; "Innovative pulse shaping for high-performance wireless TDMA," Communications Letters, IEEE vol. 5, Issue 9, Sep. 2001 pp. 372-374.

B. Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.

LTE: Evolved Universal Terrestrial Radio Access (E-UTRA); Multiplexing and channel coding (3GPP TS 36.212 version 8.8.0 Release 8), Jan. 2010.

LTE: Evolved Universal Terrestrial Radio Access (E-UTRA); Physical channels and modulation (3GPP TS 36.211 version 8.7.0 Release 8), Jun. 2009.

MD Ortigueira, M-A Lagunas; "Eigendecomposition versus singular value decomposition in adaptive array signal processing"; Signal Processing 25 (1991) pp. 35-49.

P. Comon ; G.H. Golub; "Tracking a few extreme singular values and vectors in signal processing"; Proceedings of the IEEE (vol: 78 , Issue: 8 , Aug. 1990), pp. 1327-1343.

B.N. Parlett; The Symmetric Eigenvalue Problems. Englewood Cliffs, NJ: Prentice-Hall, 1980.

Z.Ye, et al.; "A Novel Technique for the Blind Estimation of a Channel Matrix"; 1998 IEEE International Conference on Electronics, Circuits and Systems. Surfing the Waves of Science and Technology (Cat. No. 98EX196); Sep. 7-10, 1998.

G. Ricci, et al.; "Blind Multiuser Detection via Interference Identification"; IEEE Transactions on Communications, vol. 50, No. 7, Jul. 2002.

R. Schreiber; "Implementation of Adaptive Array Algorithms"; IEEE Transactions on Acoustics, Speech, and Signal Processing, vol. ASSP-34, No. 5, Oct. 1986.

P.I. Davies, M.I. Smith; "Updating the singular value decomposition"; Journal of Computational and Applied Mathematics 170 (2004), pp. 145-167.

G. Mathew, V.U. Reddy; "Adaptive Estimation of Eigensubspace"; IEEE Transactions on Signal Processing, vol. 43. No. 2, Feb. 1995.

M. Moonen, et al.; "A note on 'Efficient numerically stabilized rank-one eigenstructure updating' (and reply)"; IEEE Transactions on Signal Processing (vol. 39 , Issue: 8 , Aug. 1991), pp. 1911-1914.

K-B Yu; "Recursive updating the eigenvalue decomposition of a covariance matrix"; IEEE Transactions on Signal Processing (vol. 39 , Issue: 5 , May 1991), pp. 1136-1145.

* cited by examiner

DISTRIBUTED RADIO SYSTEM

CROSS REFERENCE TO PRIOR APPLICATIONS

This application is a Continuation of U.S. patent application Ser. No. 16/393,877, filed Apr. 24, 2019, which claims priority to Provisional Appl. No. 62/662,140, filed Apr. 24, 2018; which is hereby incorporated by reference in their entireties and all of which this application claims priority under at least 35 U.S.C. 120 and/or any other applicable provision in Title 35 of the United States Code.

BACKGROUND

I. Field

The present disclosure relates generally to communication systems, and more particularly, to selecting or updating multi-user multiple-input multiple-output (MIMO) system configurations.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.).

An example of a telecommunication standard is $5^{th}$ Generation (5G), which is a commonly used term for certain advanced wireless systems. The industry association 3rd Generation Partnership Project (3GPP) defines any system using "5G NR" (5G New Radio) software as "5G". Others may reserve the term for systems that meet the requirements of the International Telecommunications Union (ITU) IMT-2020. The ITU has defined three main types of uses that 5G will provide. They are Enhanced Mobile Broadband (eMBB), Ultra Reliable Low Latency Communications (URLLC), and Massive Machine Type Communications (mMTC). eMBB uses 5G as an evolution to 4G LTE mobile broadband services with faster connections, higher throughput, and more capacity. URLLC uses the 5G network for mission-critical applications that require uninterrupted and robust data exchange. mMTC is designed to connect a large number of low-power, low-cost devices in a wide area, wherein scalability and increased battery lifetime are primary objectives.

Massive MIMO uses large numbers of antennas with multi-user MIMO for increasing throughput and capacity, and is an important aspect of 5G. Along with these advantages, Massive MIMO has high computational complexity due to the large number of antennas. Since the processing complexity increases exponentially with respect to the number of antennas, it is useful in Massive MIMO, as well as in other MIMO systems, to efficiently provision and/or configure system resources.

SUMMARY

The systems, methods, computer program products, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

Some aspects of the disclosure provide for blind signal separation by employing sparse updates to a Multiple-Input, Multiple Output (MIMO) system and exploiting computations from a previous eigensystem to compute the updated eigensystem(s). The set of all eigenvectors of a linear transformation, each paired with its corresponding eigenvalue, is called the full eigensystem of that transformation. In some aspects disclosed herein, the eigensystem computed from a first data set used for updating eigenvalues corresponding to an updated data set may not comprise the full eigensystem (i.e., all eigenvectors and eigenvalues), but rather may be a partial version of the full eigensystem. Similarly, the eigensystem computed for any updated data set may be only a partial version of the full eigensystem. In some aspects, the (partial version) eigensystem may comprise only eigenvalues, and may comprise fewer than the total number of eigenvalues, such as the minimum eigenvalue, the maximum eigenvalue, or both. Once a particular MIMO system configuration is selected, its corresponding full eigensystem may be computed. The (first and updated) data set can comprise signal measurements from individual antennas, channel estimates made from such signal measurements, a covariance, or any other functions of the signal measurements. In the disclosed aspects, sparse updates can comprise one or more of updating antenna selection, updating antenna locations (such as via navigation of mobile platforms), updating antenna orientation, and updating spatial multiplexing weights. Further enhancements in computational efficiency can be achieved by employing less than the total number of eigenvalues to estimate MIMO performance for each candidate eigensystem, followed by filtering the set of candidates based on their respective MIMO performance estimates. Methods of blind signal analysis that can be employed herein include principal component analysis, independent component analysis, dependent component analysis, singular value decomposition (SVD), eigen-decomposition (ED), non-negative matrix factorization, stationary subspace analysis, and common spatial pattern.

Disclosed aspects can be employed in artificial intelligence systems, such as artificial neural networks. For example, sparse updates and eigensystem filtering can be employed in classification algorithms and regression algorithms. Disclosed aspects can be employed in unsupervised learning, such as grouping or clustering algorithms, feature learning, representation learning, or other algorithms designed to find structure in input data that corresponds with MIMO performance. Principal component analysis is an example of feature learning. Disclosed aspects can be employed in dimensionality reduction to reduce the number of features (e.g., via feature selection and/or feature extraction) and/or input data. Aspects can be employed in active learning and reinforcement learning.

Learned features can provide a basis for more efficiently estimating MIMO performance of a candidate eigensystem. An artificial intelligence system trained in accordance with disclosed aspects can more efficiently filter and classify candidate MIMO systems. In some aspects, the artificial intelligence system is programmed to generate MIMO system candidates, such as by inferring from data features (e.g., features in signal measurements received by candidate antennas, channel state information, metadata about the User Equipment (UE)s being served, etc.) which MIMO antenna selection(s) are likely to provide the best MIMO performance. The system may employ information about the geographical locations of UEs, UE mobility, type of data services, network topology, and/or local channel state information for selecting a MIMO system configuration, and may ingest such information as learned features. In some aspects antenna beam patterns are selectable. The system may employ codebooks containing selectable beam patterns. In a distributed antenna system that employs mobile relays, the navigation of one or more relays may be adapted by the artificial intelligence system based on the input data to reconfigure the distributed antenna system in a manner that improves MIMO performance.

In one set of aspects, systems, methods, computer program products, and devices are configured to perform a partial update to a first set of antennas (e.g., a base selection) to produce a second set of antennas (e.g., an updated selection). Updated eigenvalues (corresponding to the system of the updated selection) are computed based on fewer than the total number of eigenvalues corresponding to the first selection. A MIMO performance corresponding to the second set is computed based on the updated eigenvalues. MIMO performances corresponding to all the candidate antenna sets (e.g., the base selection and at least one updated selection) are compared, and the candidate antenna sets are filtered.

The eigenvalues can be calculated from at least one of a data matrix, a channel matrix, and a covariance matrix. Singular value decomposition or eigen-decomposition may be performed. In some aspects, the updated eigenvalues approximate the eigensystem of a modified Hermitian matrix corresponding to the second selection based on knowledge of the eigensystem of a Hermitian matrix corresponding to the first selection. MIMO performance can comprise fewer than the total number of eigenvalues. For example, a condition number that uses only the minimum eigenvalue and the maximum eigenvalue may be computed. Numerical techniques with selectable accuracy can be used to compute the eigenvalues. Lower accuracy (with corresponding lower computational complexity) can be used for initial filtering to reduce the set of candidate MIMO system configurations (e.g., antenna selections). In one aspect, computing updated eigenvalues can be performed using a spectrum-slicing algorithm to isolate eigenvalues to disjoint intervals and using Newton's method to search within at least one of the disjoint intervals.

In another set of aspects, systems, methods, computer program products, and devices are configured to reduce computational processing performed by at least one computer processor that computes an eigensystem from a first data set; computes updated eigenvalues that approximate an eigensystem of at least a second data set based on the eigensystem of the first data set; and evaluates a plurality of features in each of the first and at least second data sets using a cost function; wherein reducing the computational processing of the at least one computer processor is achieved by at least one of selecting the cost function to comprise fewer than the total number of eigenvalues and employing a coarse approximation of the eigenvalues to de-select at least one of the first and at least second data sets. These aspects can be employed for learning and/or online processing in an artificial neural network. Such aspects can be directed to blind source separation.

In another set of aspects, systems, methods, computer program products, and devices are configured to receive a plurality of signals transmitted from a plurality of transmitter antennas; measure the plurality of signals to produce an S matrix comprising a plurality of transmitted signal vectors; measure correlations between the transmitted signal vectors; and, upon determining an unacceptable amount of correlation, cause a change of scheduling of at least one of the plurality of transmitted data streams to reduce correlation between two or more spatial subchannels.

Measuring the correlations can comprise arranging a computation order of the plurality of transmitted signal vectors based on an estimated likelihood that each vector needs to be updated, and then performing orthogonalization of the S matrix. Upon the change of scheduling, the computation order enables an update to the orthogonalization to reuse previously calculated orthogonal basis vectors and operators.

In another set of aspects, systems, methods, computer program products, and devices are configured to receive a plurality of signals transmitted from a plurality of transmitter antennas; measure the plurality of signals to produce an S matrix comprising a plurality of column vectors, each column vector corresponding to one of the plurality of transmitter antennas; measure correlations between the column vectors; and, upon determining an unacceptable amount of correlation, cause a change to the receiving in order to change at least one row of the S matrix. Measuring the correlations can comprise performing orthogonalization of the S matrix. Upon causing the change to the receiving, sparse update vectors can be employed to update the orthogonalization of the S matrix.

Disclosed aspects can be employed in 5G, such as in Massive MIMO, distributed antenna systems, small cell, mmWave, massive Machine Type Communications, and Ultra Reliable Low Latency Communications. Disclosed aspects can be employed in mobile radio networks, including Vehicle-to-Everything (V2X), such as Vehicle-to-Vehicle (V2V), Vehicle-to-Infrastructure (V2I), Vehicle-to-Network (V2N) (e.g., a backend or the Internet), Vehicle-to-Pedestrian (V2P), etc. Disclosed aspects can be employed in Uu transport: e.g., transmission of data from a source UE to a destination UE via the eNB over the conventional Uu interface (uplink and downlink). Disclosed aspects can be employed in Sidelink (also referred to as D2D): e.g., direct radio link for communication among devices in 3GPP radio access networks, as opposed to communication via the cellular infrastructure (uplink and downlink). Aspects disclosed herein can be employed in Dedicated Short-Range Communications (DSRC): e.g., the set of standards relying on IEEE 802.11p and the WAVE protocols.

In the disclosed aspects, low-latency radio network infrastructure (such as 5G infrastructure) can be exploited to provision the disclosed processing offsite, such as in data centers connected to the radio access network by a backhaul network (e.g., the Internet or other data network). In the case of mobile relays, such as unmanned aerial systems (UASs), UEs, and other power-constrained (e.g., battery-powered or energy-harvesting) devices, the provisioning of MIMO processing offsite can be advantageous in that it reduces computational overhead (and thus power consumption) on the mobile relays, and the low latency of the 5G link makes offsite MIMO processing feasible. In some aspects, the parallel nature of the processing in disclosed aspects can be exploited at the radio access network edge, such as via a wireless (edge) Cloud configuration amongst the computational resources of mobile relays (and/or computational resources to which mobile relays directly connect). In such aspects, edge devices can employ Uu and/or D2D to communicate MIMO processing data in the edge Cloud. In one example, UEs employ URLLC links to communicate MIMO processing information in the edge Cloud (thus exploiting the lowest-latency configuration in 5G NR), and the MIMO processing is performed to configure spatial multiplexing in the enhanced Mobile Broadband (eMBB) link.

Aspects disclosed herein can be implemented as apparatus configurations comprising structural features that perform the functions, algorithms, and methods described herein. Flow charts and descriptions disclosed herein can embody instructions, such as in software residing on a non-transitory computer-readable medium, configured to operate a processor (or multiple processors). Flow charts and functional descriptions, including apparatus diagrams, can embody methods for operating a communication network(s), coordinating operations which support communications in a network(s), operating network components (such as client devices, server-side devices, relays, and/or supporting devices), and assembling components of an apparatus configured to perform the functions disclosed herein.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

The following patent applications and patents are hereby incorporated by reference in their entireties:
U.S. Pat. No. 8,670,390,
U.S. Pat. No. 9,225,471,
U.S. Pat. No. 9,270,421,
U.S. Pat. No. 9,325,805,
U.S. Pat. No. 9,473,226,
U.S. Pat. No. 8,929,550,
U.S. Pat. No. 7,430,257,
U.S. Pat. No. 6,331,837,
U.S. Pat. No. 7,076,168,
U.S. Pat. No. 7,965,761,
U.S. Pat. No. 8,098,751,
U.S. Pat. No. 7,787,514,
U.S. Pat. No. 9,673,920,
U.S. Pat. No. 9,628,231,
U.S. Pat. No. 9,485,063,
Patent application Ser. No. 10/145,854,
Patent application Ser. No. 14/789,949,
Pat. Appl. No. 62/197,336,
Patent application Ser. No. 14/967,633,
Pat. Appl. No. 60/286,850,
Patent application Ser. No. 14/709,936,
Patent application Ser. No. 14/733,013,
Patent application Ser. No. 14/789,949,
Patent application Ser. No. 13/116,984,
Patent application Ser. No. 15/218,609,
Patent application Ser. No. 15/347,415,
Pat. Appl. No. 62/510,987,
Pat. Appl. No. 62/527,603,
Pat. Appl. No. 62/536,955,
J. S. Chow, J. M. Cioffi, J. A. C. Bingham; "Equalizer Training Algorithms for Multicarrier Modulation Systems," Communications, 1993. ICC '93 Geneva. Technical Program, Conference Record, IEEE International Conference on; Vol: 2, 23-26 May 1993, pp. 761-765;
Vrcelj et al. "Pre- and post-processing for optimal noise reduction in cyclic prefix based channel equalizers." Communications, 2002. ICC 2002. IEEE International Conference on. Vol. 1. IEEE, 2002;
LTE: Evolved Universal Terrestrial Radio Access (E-UTRA); Physical channels and modulation (3GPP TS 36.211 version 8.7.0 Release 8), June 2009; and
LTE: Evolved Universal Terrestrial Radio Access (E-UTRA); Multiplexing and channel coding (3GPP TS 36.212 version 8.8.0 Release 8), January 2010.

All of the references disclosed herein are incorporated by reference in their entireties.

BRIEF DESCRIPTION OF DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

Figure 1:
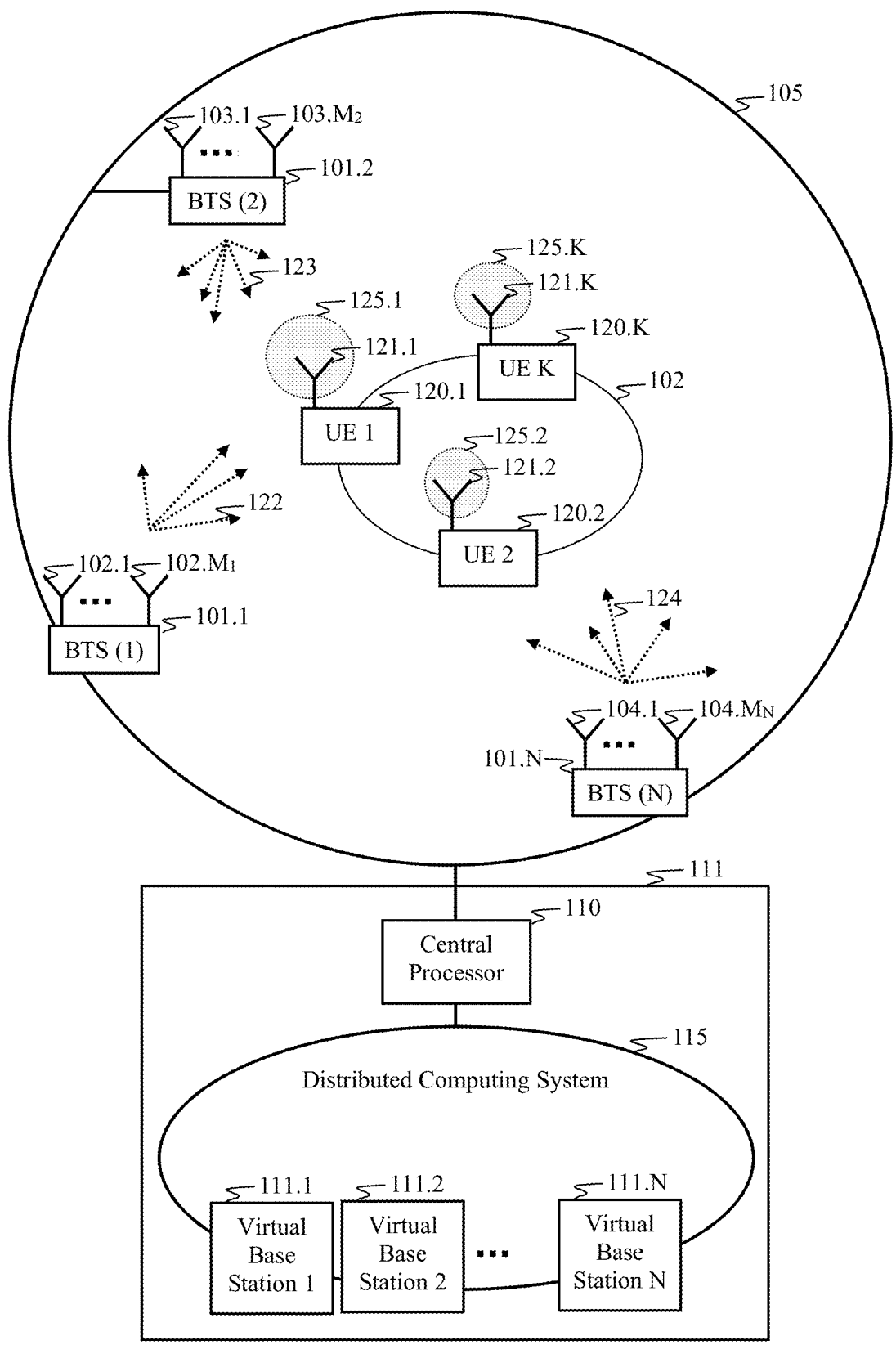
FIG. 1 is a block diagram of a radio communication system architecture in which exemplary aspects of the disclosure can be implemented. Aspects of the disclosure are not limited to the depicted system architecture, as such aspects can be implemented in alternative systems, system configurations, and applications.

It should be appreciated that elements described in one aspect can be beneficially utilized on other aspects without specific recitation.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Some aspects of the disclosure exploit the linearity property of an invertible transform operation to reduce computational complexity of an update procedure, wherein the update can employ a sparse matrix. For example, the DFT can be expressed by $\mathcal{F}[x[m]] = X(e^{iw})$, and the linearity property of the DFT is:

$$\mathcal{F}[ax[m]+by[m]] = aX(e^{iw}) + bY(e^{iw}) = a\mathcal{F}[x[m]] + b\mathcal{F}[y[m]]$$

This means that the DFT of the sum of two matrices (such as sequences x and y) equals the sum of the DFTs of each of the matrices. Aspects of the disclosure can exploit the same linearity property for any other linear transform operations.

Some aspects of the disclosure exploit the linearity property of such invertible transforms along with sparse update matrices in order to simplify update calculations and provide for efficient computational processing in digital communications. Some applications include reducing the PAPR of a transmitted signal, selecting a combination of receiver antennas to optimize MIMO performance (such as may be measured by total link capacity, rank, condition number, and the like), selecting a combination of transmitter antennas to optimize MIMO performance, resource scheduling to optimize link performance, or some combination thereof.

Some aspects of the disclosure make use of the property that matrix multiplication distributes across addition:

$$A(B+C) = AB + AC$$

$$(B+C)D = BD + CD$$

Where A is an m×n matrix and B and C are n×p matrices and D is a p×s matrix.

By way of example, and without limitation, the product of a MIMO precoding matrix A with a data vector (represented by the sum of data vectors B and C above) equals the sum of precoded data vectors AB and AC. In one aspect, AB is a base vector (possibly generated from a previous iteration), and C is an update vector with at least some values equal to zero (e.g., a sparse vector). Thus, the updated precoded data vector A(B+C) can be produced by precoding the sparse update symbol vector C and adding the resulting product to the base vector AB.

By way of example, and without limitation, the sum of precoding matrices B and C configured to precode a data symbol matrix (e.g., a data symbol vector D) is equivalently achieved by separately precoding the data symbol vector D with B and C, and then summing the products. In some aspects, for a given data symbol vector D, a precoding matrix is developed to produce a desirable condition, such as may be indicated by a measured PAPR that is below a predetermined threshold, or may be indicated by a measurement of decorrelation of the spatial subchannels in a MIMO communication system. In the case of MIMO, the desirable condition might be indicated by a function of measured eigenvalues, channel matrix, covariance matrix, condition number, or the like compared to a threshold value. In aspects disclosed herein, an adaptation to a base precoding matrix B can be provided using a sparse update precoding matrix C, wherein at least some of the matrix values are zero. For example, the product CD may be determined and then added to BD, which may be a base calculated in a previous iteration. Signal parameters used to determine a relationship to the desirable condition (e.g., low PAPR, low MIMO cross-correlation, improved MIMO bandwidth efficiency, improved data capacity, etc.) can be measured, the sum stored (possibly to be used as a base in a subsequent iteration), and then the next update precoding matrix is generated. This process may be repeated a predetermined number of times or when some criterion related to the desirable condition(s) is met.

FIG. 1 is a block diagram of a communication network, such as a 5G network, in which aspects of the disclosure can be implemented. A plurality N of geographically distributed base transceiver stations (BTSs) 101.1-101.N (BTS(1), BTS(2), . . . , BTS(N)) may be communicatively coupled to at least one central processing system 111 via a communication network 105. Each BTS 101.1-101.N comprises an antenna system configured for communicating with one or more mobile units (e.g., UEs) 120.1-120.K and/or other devices, such as relays (not shown), via a WWAN radio access network (RAN). BTSs may also be referred to as gNodeBs.

In one aspect, the first base transceiver station 101.1 comprises a first antenna array comprising a first plurality $M_1$ of antennas 102.1-102.$M_1$, the second base transceiver station 101.2 comprises a second antenna array comprising a second plurality $M_2$ of antennas 102.1-102.$M_1$, and the $N^{th}$ base transceiver station 101.N comprises an $N^{th}$ antenna array comprising an $N^{th}$ plurality $M_N$ of antennas 104.1-104.$M_N$. The base transceiver stations 101.1-101.N are configured to provide RAN services to the plurality K of units 120.1, 120.2, . . . , 120.K, each having its own antenna system 121.1, 121.2, . . . , 121.K, respectively. Each antenna system 121.1, 121.2, . . . , 121.K may comprise one or more antennas.

The communication network 105 can comprise a fiber network, a cable (e.g., "wired") network, a wireless network (including a free-space optical network), or any combination thereof. In some aspects, the network 105 is referred to as a "fronthaul" network. In some aspects, the network 105 can comprise a backhaul network. In accordance with one aspect of the disclosure, a network that connects base transceiver stations to a processing system configured to perform joint processing (e.g., system 111) can be referred to as a fronthaul, and a network (such as network 115) which connects processing elements of the processing system 111 can be referred to as a backhaul.

The terms "backhaul" and "fronthaul" can be used interchangeably in some aspects of the disclosure. A fronthaul is similar to a backhaul, which, at its simplest, links a radio access network to a wired (e.g., cable or optical fiber) network. A fronthaul can comprise a backhaul, or a portion of a backhaul. For example, a fronthaul can comprise a connection between one or more centralized controllers and remote stand-alone radio heads. A fronthaul can connect a central processor to multiple base transceiver stations. A fronthaul connects multiple base transceiver stations together when one or more of the base transceiver stations functions as a central processor. As used herein, a fronthaul may comprise a traditional backhaul network. For example, a fronthaul can comprise at least a portion of S1 and/or X2 interfaces. A fronthaul may be part of a base station network.

In dense BTS deployments, some of the RAN processing can be distributed close to the edge of the RAN edge, such as in the BTSs and/or in hubs that connect BTSs together. Some processing can be performed farther away from the RAN edge, such as closer to and/or within a core network. In some aspects, RAN processing that is sensitive to latency is performed at or near the RAN edge, such as in BTSs 101.1-101.N, whereas processing that is not as sensitive to latency can be performed farther away from the RAN edge, such as central processor 110 and/or a distributed computing system in a data center.

As 5G reduces latency to as little as 1 ms, latency-sensitive processing can be migrated from the edge to the core. In some aspects, since latency in the RAN can be affected by network loading, as congestion increases, the network can dynamically migrate latency-sensitive processing operations from the core to the edge by re-provisioning processing resources, such as servers and memory storage. Edge processing resources may include UEs. By way of example, the network can respond to loading by re-provisioning virtual machine components (such as processors, memory, and network connections operating as a bus) by determining which virtual machine components contribute the most to processing latency, followed by replacing one or more of those components with component(s) that contribute less to processing latency. Similarly, as RAN congestion is reduced, processing resources in the core network can be provisioned to take over responsibilities of resources operating at the network edge. In some aspects, at least some of the processing performed by UEs may be offloaded to BTSs and/or servers in the core network when it is equitable relative to the availability of RAN resources to do so.

In one aspect of the disclosure, the RAN processing system 111 comprises a distributed computing system configured to coordinate a plurality of physical processors (which may be centrally located or geographically distributed) such as to perform joint processing. In some aspects, the plurality of physical processors can be represented as processors 111.1-111.N. In other aspects, virtual processors (such as virtual base stations implemented as software-defined radios (SDRs)) can be represented as processors 111.1-111.N.

By way of example, but without limitation, physical processors in a distributed computing environment can be represented as processors 111.1-111.N. As used herein, the term "processor" can refer to a computer processor, a computer, a server, a central processing unit (CPU), a core, a microprocessor, and/or other terminology that indicates electronic circuitry configurable for carrying out instructions of a computer program. In some aspects, a processor comprises geographically distributed computing elements (e.g., memories, processing cores, switches, ports, and/or other computing or network resources). A fronthaul and/or backhaul network communicatively coupling the geographically distributed computing elements can function as a computer bus.

The processors are communicatively coupled together via at least one network, such as a backhaul network 115. The backhaul network 115 can comprise an optical fiber network, a wireline network (e.g., Ethernet or other cable links), a wireless network, or any combination thereof. In some aspects, the backhaul network 115 can comprise the RAN. In one aspect, each of N processors is programmed to function as one of a plurality N of virtual base stations 111.1-111.N. In another aspect, each virtual base station 111.1-111.N comprises multiple processing cores. In some aspects, each virtual base station 111.1-111.N represents a hardware abstraction wherein details of how the hardware is implemented are concealed within the representation of each "processor" 111.1-111.N as a single element. In such aspects, the physical implementation of each processor 111.1-111.N can comprise physical computing elements that are geographically distributed and/or physical computing elements that are shared by multiple virtual base stations 111.1-111.N.

Each virtual base station 111.1-111.N can be distributed across a plurality of processors and memories. By way of example, a virtual base station 111.1-111.N can comprise software instructions residing on one or memories near the RAN edge (e.g., on BTS 101.1-101.N) and configured to operate one or more RAN-edge processors. The RAN-edge portion of the virtual base station 111.1-111.N can be configured to perform latency-sensitive RAN processing operations and may include a mobility source-code segment configured to migrate the virtual base station 111.1-111.N portion from one network device to another, such as when its associated UE moves through the network. The virtual base station 111.1-111.N can also comprise software instructions residing on one or memories farther away from the RAN edge (such as near or within the core network) configured to operate one or more processors, such as located in the central processor 110, in a BTS configured to function as a hub or central processor, and/or in a remote data center. The core-portion of the virtual base station 111.1-111.N can be configured to perform RAN processing operations that are less latency-sensitive.

By way of example, each virtual base station 111.1-111.N may comprise one or more of the processors and perform base station processing operations that would ordinarily be performed solely by one of the corresponding base stations 101.1-101.N. Specifically, virtual base stations can be implemented via software that programs general-purpose processors. For example, an SDR platform virtualizes baseband processing equipment, such as modulators, demodulators, multiplexers, demultiplexers, coders, decoders, etc., by replacing such electronic devices with one or more virtual devices, wherein computing tasks perform the functions of each electronic device. In computing, virtualization refers to the act of creating a virtual (rather than actual) version of something, including (but not limited to) a virtual computer hardware platform, operating system (OS), storage device, or computer network resources.

In accordance with the art of distributed computing, a virtual base station's functions can be implemented across multiple ones of the plurality of processors. For example, workloads may be distributed across multiple processor cores. In some aspects, functions for more than one base station are performed by one of the processors.

As used herein, distributed computing refers to the use of distributed systems to solve computational problems. In distributed computing, a problem is divided into multiple tasks, and the tasks are solved by multiple computers which communicate with each other via message passing. A computer program that runs in a distributed system is referred to as a distributed program. An algorithm that is processed by multiple constituent components of a distributed system is referred to as a distributed algorithm. In a distributed computing system, there are several autonomous computational entities, each of which has its own local memory.

In accordance with aspects of the disclosure, the computational entities (which are typically referred to as computers, processors, cores, CPUs, nodes, etc.) can be geographically distributed and communicate with each other via message passing. In some aspects, message passing is performed on a fronthaul and/or backhaul network. The distributed computing system can consist of different types of computers and network links, and the system (e.g., network topology, network latency, number of computers, etc.) may change during the execution of a distributed program. In one aspect, a distributed computing system is configured to solve a computational problem. In another aspect, a distributed computing system is configured to coordinate and schedule the use of shared communication resources between network devices. In some aspects, the virtual base stations 111.1-111.N are implemented as middleware, each residing on one or more network devices, and in some cases, each distributed across multiple network devices for accessing either or both RAN-edge services and core services. Such implementations can comprise "fluid" middleware, as the virtual base stations 111.1-111.N (or at least the distributed components thereof) can migrate from one network device to another, such as to reduce latency, balance processing loads, relieve network congestion, and/or to effect other performance and/or operational objectives.

A distributed computing system can comprise a grid computing system (e.g., a collection of computer resources from multiple locations configured to reach a common goal, which may be referred to as a super virtual computer). In some aspects, a distributed computing system comprises a computer cluster which relies on centralized management that makes the nodes available as orchestrated shared servers. In some aspects, a distributed computing system comprises a peer-to-peer computing system wherein computing and/or networking comprises a distributed application architecture that partitions tasks and/or workloads between peers. In some aspects, peers are equally privileged, equipotent participants in the application. They are said to form a peer-to-peer network of nodes. Peers make a portion of their resources, such as processing power, disk storage, network bandwidth, etc., available to other network participants without the need for central coordination by servers or stable hosts. Peers can be either or both suppliers and consumers of resources.

In some aspects, the central processor resides at the edge of the RAN network. The central processor 110 can provide for base-station functionality, such as power control, code assignments, and synchronization. The central processor 110 may perform network load balancing (e.g., scheduling RAN resources), including providing for balancing transmission power, bandwidth, and/or processing requirements across the radio network. Centralizing the processing resources (i.e., pooling those resources) facilitates management of the system, and implementing the processing by employing multiple processors configured to work together (such as disclosed in the '163 application) enables a scalable system of multiple independent computing devices, wherein idle computing resources can be allocated and used more efficiently.

In some aspects, base-station functionality is controlled by individual base transceiver stations and/or UEs assigned to act as base stations. Array processing may be performed in a distributed sense wherein channel estimation, weight calculation, and optionally, other network processing functions (such as load balancing) are computed by a plurality of geographically separated processors. In some aspects, access points and/or subscriber units are configured to work together to perform computational processing. A central processor (such as central processor 110) may optionally control data flow and processing assignments throughout the network. In such aspects, the virtual base stations 111.1-111.N (or components thereof) can reside on UEs, relays, and/or other RAN devices.

Distributed virtual base stations 111.1-111.N can reduce fronthaul requirements by implementing at least some of the Physical Layer processing at the base transceiver stations 101.1-101.N while implementing other processing (e.g., higher layer processing, or the higher layer processing plus some of the Physical layer processing) at the central processor 110. In some aspects of the disclosure, one or more of the base transceiver stations 101.1-101.N depicted in the figures may be replaced by UEs adapted to perform as routers, repeaters, and/or elements of an antenna array.

In one aspect of the disclosure, the base station network comprising base transceiver stations 101.1-101.N is adapted to operate as an antenna array for MIMO subspace processing in the RAN. In such aspects, a portion of the network may be adapted to serve each particular UE. The SDRs (represented as the virtual base stations 111.1-111.N) can be configured to perform the RAN baseband processing. Based on the active UEs in the RAN and the standard(s) they use for their wireless links, the SDRs can instantiate virtual base station processes in software, each process configured to perform the baseband processing that supports the standard(s) of its associated UE(s) while utilizing a set of the base transceiver stations within range of the UE(s).

In accordance with one aspect of the disclosure, baseband waveforms comprising RAN channel measurements and/or estimates (such as collected by either or both the UEs and the base transceiver stations) are processed by the SDRs (such as in a Spatial Multiplexing/Demultiplexing module (not shown)) using Cooperative-MIMO subspace processing to produce pre-coded waveforms. A routing module (not shown) sends the pre-coded waveforms over the fronthaul 105 to multiple ones of the base transceiver stations 101.1-101.N, and optionally, to specific antennas $102.1\text{-}102.M_1$, $103.1\text{-}103.M_2$, . . . , $104.1\text{-}104.M_N$. The base transceiver stations 101.1-101.N can be coordinated to concurrently transmit the pre-coded waveforms such that the transmitted waveforms propagate through the environment and constructively interfere with each other at the exact location of each UE 120.1-120.K.

In one aspect, the super-array processing system 111 configures complex-weighted transmissions 122, 123, and 124 from the geographically distributed base transceiver station 101.1, 101.2, and 101.N, respectively to exploit the rich scattering environment in a manner that focuses low-power scattered transmissions to produce a concentrated high-power, highly localized signal (e.g., coherence zones 125.1, 125.2, . . . , 125.K) at each UE's 120.1-120.K antenna system 121.1, 121.2, . . . , 121.K, respectively. The coherent combining of the transmitted waveforms at the location of each UE 120.1-120.K can result in the synthesis of the baseband waveform that had been output by the SDR instance associated with that particular UE 120.1-120.K. Thus, all of the UEs 120.1-120.K receive their own respective waveforms within their own synthesized coherence zone concurrently and in the same spectrum.

In accordance with one aspect of the invention, each UE's corresponding synthesized coherence zone comprises a volume that is approximately a carrier wavelength or less in width and centered at or near each antenna on the UE. This can enable frequency reuse between nearby—even co-located—UEs. As disclosed in the '107 application, Spatial Multiplexing/Demultiplexing can be configured to perform maximum ratio processing. Any of various algorithms for MIMO processing disclosed in the '107 application may be employed by methods and apparatus aspects disclosed herein. Some aspects can comprise zero forcing, such as to produce one or more interference nulls, such as to reduce interference from transmissions at a UE that is not an intended recipient of the transmission. By way of example, but without limitation, zero forcing may be performed when there are a small number of actual transmitters (e.g., base transceiver station antennas) and/or effective transmitter sources (e.g., scatterers in the propagation environment).

In alternative aspects, at least one of the BTSs is configured to transmit downlink signals without spatial precoding. In such cases, the UEs receiving such downlink transmissions might be configured to perform spatial processing.

By way of example, some aspects of the disclosure configure the UEs 120.1-120.K to form a cluster in which the individual UEs 120.1-120.K are communicatively coupled together via a client device fronthaul network 102, which can comprise any of various types of local area wireless networks, including (but not limited to) wireless personal area networks, wireless local area networks, short-range UWB networks, wireless optical networks, and/or other types of wireless networks. In some aspects, since the bandwidth of the client device fronthaul network 102 is typically much greater than that of the WWAN, a UE 120.1-120.K can share its access to the RAN (i.e., its WWAN spatial subchannel, or coherence zone) with other UEs 120.1-120.K in the cluster, thus enabling each UE 120.1-120.K to enjoy up to a K-fold increase in instantaneous data bandwidth.

In some aspects, a cluster of UEs can perform cooperative subspace demultiplexing. In some aspects, the cluster can perform cooperative subspace multiplexing by coordinating weighted (i.e., pre-coded) transmissions to produce localized coherence zones at other clusters and/or at the base transceiver stations 101.1-101.N. In some aspects, the UEs 120.1-120.K comprise a distributed computing platform configured to perform distributed processing (and optionally, other cloud-based services). Distributed processing may be performed for Cooperative-MIMO, other various SDR functions, and/or any of various network control and management functions.

Thus, each UE may comprise a distributed SDR, herein referred to as a distributed UE SDR. Components of the distributed UE SDR can reside on multiple network devices, including UEs, relays, BTSs, access points, gateways, routers, and/or other network devices. Components of the distributed UE SDR can be communicatively coupled together by any combination of a WPAN (such as may be used for connecting an ecosystem of personal devices to a UE), a peer-to-peer network connecting UEs together and possibly other devices, a WLAN (which may connect UEs to an access point, router, hub, etc.), and at least one WWAN. In some aspects, distributed UE SDR components can reside on a server connected via a gateway or access point. In some aspects, distributed UE SDR components can reside on one or more BTSs, WWAN hubs, WWAN relays, and central processors, and/or on network devices in the core network.

Figure 2:
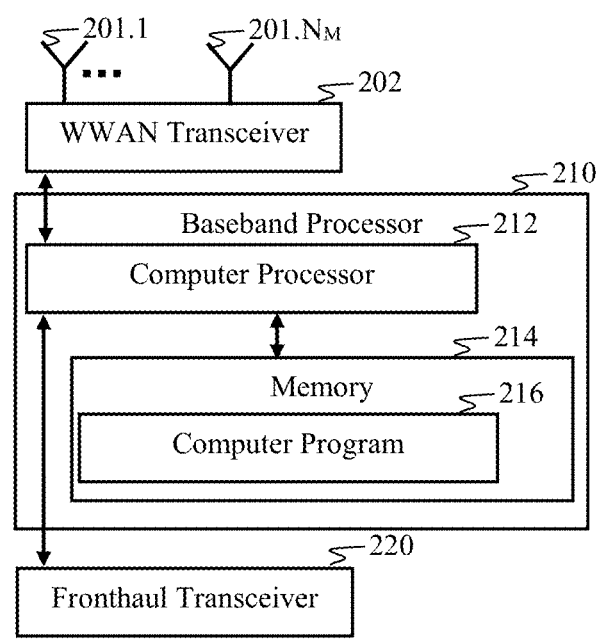
FIG. 2 is a block diagram of a radio terminal in which exemplary aspects of the disclosure can be implemented. Aspects of the disclosure are not limited to the depicted terminal design, as such aspects can be implemented in alternative devices, configurations, and applications.

FIG. 2 depicts a radio terminal. Aspects of the disclosure can be implemented in a baseband processor 210 comprising at least one computer or data processor 212, at least one non-transitory computer-readable memory medium embodied as a memory 214 that stores data and a program of computer instructions 216, and at least one suitable radio frequency (RF) transmitter/receiver 202 for bidirectional wireless communications via one or more antennas $201.1\text{-}201.N_M$. Optionally, a fronthaul transceiver 220 can be provided for communicating with other devices, such as other radio terminals.

In some aspects, the radio terminal in FIG. 2 is a BTS (BTS), such as an eNodeB, an access point, or some other type of BTS. The antenna system $201.1\text{-}201.N_M$ may comprise an antenna array with $N_M$ antennas. The antenna system $201.1\text{-}201.N_M$ may comprise a distributed antenna array. The transceiver 202 may comprise a distributed transceiver configuration. For example, aspects of the disclosure can be implemented with a BTS communicatively coupled to one or more remote radio heads, relay nodes, at least one other BTS or the like. Each antenna $201.1\text{-}201.N_M$ or each of a set of the antennas $201.1\text{-}201.N_M$ may comprise its own transceiver. The transceiver comprises RF circuitry for transmitting and receiving signals in a radio access network (RAN), such as a mobile radio network or the like. In some aspects, the transceiver 202 comprises at least some RAN baseband processing circuitry. In some aspects, the BTS employs the fronthaul transceiver 220 to communicate with other BTSs over a fronthaul network. Processes disclosed herein can be performed by baseband processor 210 to produce low-PAPR transmission signals to be transmitted by other radio terminals, such as BTSs, UEs, relays, remote radio heads, and/or other radio terminals. In some aspects, the baseband processor 210 resides offsite from the BTS location.

The baseband processor 210 may employ distributed computing resources and storage, such as a Cloud-based system, for example. In some aspects, the baseband processor 210 is virtualized. Virtualization is well known in the art, and the baseband processor can be implemented according to usual and customary techniques for virtualizing processing, memory, routing, and/or other networking resources, as well as according to virtualization techniques disclosed in Applicant's other patent applications or that may be developed in the future.

In some aspects, the radio terminal in FIG. 2 is a UE or some other type of user device. The UE's antenna system $201.1$-$201.N_M$ may employ an antenna array. In some aspects, the UE's antenna array $201.1$-$201.N_M$ can comprise antennas on at least one other device which is communicatively coupled to the UE via a fronthaul network by the fronthaul transceiver 220. Cooperative-MIMO techniques may be employed for cooperatively processing signals in the antenna system $201.1$-$201.N_M$. The UE may be communicatively coupled to other devices (e.g., other UEs, BTSs, relays, access points for other networks, external computer processing devices, or the like) via the fronthaul network. The UE may be communicatively coupled to the baseband processor 210 via the RAN. The baseband processor 210 may reside in the UE, in a BTS, in a relay node, and/or in at least one other type of device external to the UE. The baseband processor 210 may be configured to calculate PAPR-reduction signals for the UE and/or at least one other device in the RAN.

In some aspects, the radio terminal in FIG. 2 is a relay device. The relay device may employ an antenna array and/or it may be configured to perform cooperative array processing with at least one other radio terminal. As described above, the baseband processor 210 may reside on the radio terminal and/or on one or more devices communicatively coupled to the radio terminal. The baseband processor 210 may be configured to perform the processing methods disclosed herein for the radio terminal and/or at least one other device in the RAN.

Figure 3:
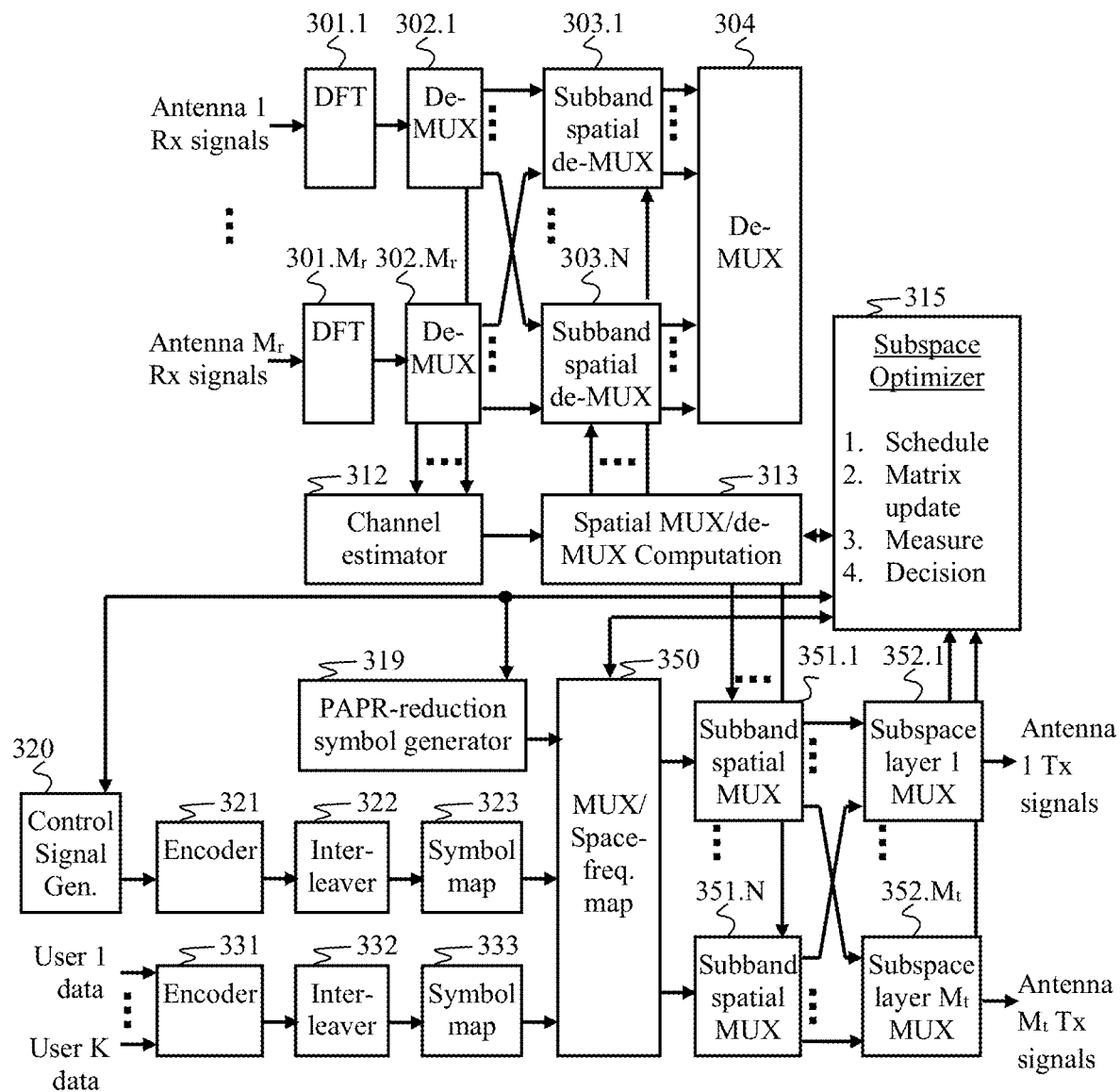
FIG. 3 is a block diagram of a MIMO-OFDM transceiver according to some aspects of the disclosure.

FIG. 3 is a block diagram of a MIMO-OFDM transceiver according to some aspects of the disclosure. DFT units $301.1$-$301.M_r$ receive input samples from a plurality $M_r$ of receiver antenna systems (not shown), which receive transmissions from a plurality of antennas (e.g., at least one other MIMO-OFDM transceiver, a plurality of user devices, etc.) in a radio access network, such as a mobile radio network. Each DFT unit $301.1$-$301.M_r$ performs a DFT on the input samples for each symbol period to obtain N frequency-domain values for that symbol period. Each demultiplexer $302.1$-$302.M_r$ receives the frequency-domain values from DFT units $301.1$-$301.M_r$, respectively, and provides frequency-domain values for received data to a plurality N of subband spatial processors $303.1$-$303.M_r$. The demultiplexers $302.1$-$302.M_r$ perform despreading and descrambling, if necessary.

Received pilot signals are processed by at least one channel estimator, such as channel estimator 312, for example. In some aspects, the transceiver's antennas are used as both transmitting antennas and receiving antennas. Thus, the channel estimator 312 can derive channel estimates (e.g., CSI) corresponding to each transmit antenna based on the received pilot values. Alternatively, CSI may be fed back from other radio terminals in the radio access network. The CSI may be processed as part of an antenna-selection process that selects a set of transmit antennas and/or receive antennas, such as to improve MIMO performance. In some aspects, the CSI may be used as part of process that selects transmitter and/or receiver antenna beam patterns to improve MIMO performance.

A spatial multiplexer/demultiplexer computation unit 313 forms a channel response matrix for each subband in each time slot based on the channel estimates for all transmitters scheduled to use that subband and time slot. Unit 313 may be configurable to perform antenna selection, such as receiver antenna selection and transmit antenna selection. Unit 313 may then derive a spatial filtering (i.e., spatial demultiplexing) matrix for each subband of each time slot based on the channel response matrix. Unit 313 may derive a spatial precoding (i.e., spatial multiplexing) matrix for each subband of each time slot based on the channel response matrix. Unit 313 may provide N spatial demultiplexing matrices for the N subbands in each time slot and/or N precoding matrices for the N subbands in each time slot.

Each subband spatial demultiplexer $303.1$-$303.N$ receives the spatial demultiplexing matrix for its corresponding subband, performs receiver spatial processing (i.e., spatial demultiplexing) on the received data values with the spatial demultiplexing matrix, and generates estimates of the original data symbols. A demultiplexer 304 maps the symbol estimates to each of a plurality of user data streams (e.g., traffic channels), for example, corresponding to different user devices in the radio access network. Although not shown, a receiver data processor is typically included in the demultiplexer 304 and configured to perform addition processing operations. For example, the data processor may perform SC-FDMA de-spreading, equalization, symbol demapping, de-interleaving, and/or decoding.

A plurality K of user data streams is processed by a data-processing chain comprising an encoder 331, interleaver 332, and symbol mapper 333. Similarly, control signals generated by a control signal generator 320 are processed by encoder 321, interleaver 322, and symbol mapper 323. Optionally, a PAPR-reduction symbol generator 319 is provided for generating PAPR-reduction symbols to be inserted in one or more space-frequency channels to reduce the PAPR of signals transmitted by at least some of the transmit antennas. Pilot symbols may be generated by the control signal generator 320, and/or may be inserted downstream.

A multiplexer/space-frequency mapper 350 multiplexes user data and control signals and maps the signals to predetermined space-frequency channels. Each of a plurality N of subband spatial multiplexing units $351.1$-$351.N$ can employ the spatial precoding matrix generated by the computation unit 313 for the corresponding subband to multiplex the user data and control signals onto spatial multiplexing subspace channels. In each of the N subbands, for example, there are up to $M_t$ subspaces. MUX/mapper 350 can be configured to schedule physical resource blocks in each subspace for traffic and/or control channels, or is otherwise responsive to such scheduling to map data symbols into corresponding space-frequency elements. Each of a plurality $M_t$ of subspace layer multiplexers $352.1$-$352.M_t$ aggregates the plurality N of subband signals corresponding to its subspace channel to produce a subspace-layer signal. The subspace-layer signal can comprise a vector of N symbols, denoted as one of "Antenna 1 transmit signal" to "Antenna $M_t$ transmit signal," each of which is modulated onto one of the N OFDM subcarrier frequencies in its corresponding transmitter (not shown).

A Subspace Optimizer 315 is configured to adapt at least one of transmission parameters and receiver parameters to improve MIMO performance. The Optimizer 315 might comprise separate components or modules. In one aspect, the Optimizer 315 employs a scheduler configured to schedule transmitter and/or receiver parameters. In one aspect, the Optimizer 315 is responsive to the scheduler to update at least one matrix that can be processed to determine correlations between subspace channels. The Optimizer 315 might measure updated correlations and/or changes in correlation as a result of the matrix update. A decision process evaluates the updated correlation(s) and/or changes in correlation to determine subsequent scheduling. The above steps may be repeated until one or more criteria are met. The Optimizer 315 outputs a schedule update that improves MIMO performance. In some aspects, Optimizer 315 might make other signal measurements, such as PAPR, and the decision process might be configured to perform a multi-objective decision based on the combination of measurements.

In one aspect of the disclosure, Principal Component Analysis (PCA) is employed, such as by way of Singular Value Decomposition (SVD). In another aspect Independent Component Analysis (ICA) can be employed. In such aspects, the data is projected onto a set of axes that fulfills some statistical criterion which implies independence. Since PCA and ICA transformations depend on the structure of the data being analyzed, the axes onto which the data is projected are discovered. For example, the axes may be independent of one another in some sense. This process assumes a set of independent sources of the data exists, but does not necessarily need to assume or know the exact properties of the data. For example, such techniques can define some measure of independence and then decorrelate the data by maximizing this measure for or between projections. If the axes of the projections are discovered rather than predetermined, the process is a blind source separation. Semi-blind aspects of the disclosed processes exploit some known information about the sources, and the techniques disclosed herein can be adapted accordingly. If the structure of the data (or the statistics of the underlying sources) changes over time, the axes onto which the data are projected can change too. Aspects can provide for adapting the direction of projection so as to increase the signal-to-noise ratio (SNR) for a particular signal source or set of sources. By discarding projections that correspond to unwanted sources (e.g., noise, interference, etc.) and inverting the transformation, filtering of the observation is effected.

In one aspect, PCA is employed wherein variance is used to determine a set of orthogonal axes. ICA may employ kurtosis (or some other measure of non-Gaussianity) to determine axes, which are not necessarily orthogonal. For example, maximizing non-Gaussianity can provide maximally independent signals. Kurtosis can be used to transform an observation of a Gaussian-like signal mixture into a set of its non-Gaussian (and thus, independent) component signals, whereas variance can be exploited to separate Gaussian sources.

By way of example, an observed data set comprises a desired signal and a noise component. Noise or artifact removal often comprises a data reduction step (filtering) followed by data reconstruction (such as interpolation). The term, noise, is often used to describe interference. In this sense, noise can comprise another independent information source that is mixed into the observation. Noise is often correlated (with itself or sometimes the source of interest), or concentrated at certain values.

In aspects disclosed herein, data reduction (or filtering) is performed via projection onto a new set of axes, and may be followed by data reconstruction via projection back into the original observation space. By reducing the number of axes (or dimensions) onto which the data is projected, a filtering operation is provided for by discarding projections onto axes that are believed to correspond to noise. Interpolation can be performed by projecting from a dimensionally reduced space (into which the data has been compressed) back to the original space.

A transformation is represented by:

$$Y^T = W X^T$$

wherein X is an M×N signal matrix (e.g., the signal is N-dimensional with M samples per vector) that is transformed by an N×N transformation matrix W into an M×N transformed signal matrix Y. Matrix W is a transformation that maps (i.e., projects) the data into another space that serves to highlight different patterns in the data along different projection axes.

Filtering can comprise discarding or separating out parts of the signal that obscure desired information (e.g., the signal of interest). This involves discarding one or more dimensions (or subspaces) that correspond to noise. The transformation can be an orthogonal transform or a bi-orthogonal transform. Transformations can be lossless (so that the transformation can be reversed and the original data restored exactly) or lossy. When a signal is filtered or compressed (e.g., via downsampling), information can be lost, and the transformation is not invertible. For example, lossy transformations can involve a non-invertible transformation of the data via a transformation matrix that has at least one column set to zero. Thus, there is an irreversible removal of some of the N-dimensional data, and this corresponds to a mapping to a lower number of dimensions (p<N).

Both PCA and ICA can be used to perform lossy or lossless transformations by multiplying observation data by a separation or demixing matrix. Lossless PCA and ICA both project the observation data onto a set of axes that are determined by the nature of the data, and thus can be methods of blind source separation (BSS), such as when the axes of projection (and thus, the sources) are determined via application of an internal measure and without the use of prior knowledge of the data structure.

Filtering can comprise setting columns of the PCA or ICA separation matrices that correspond to unwanted sources to zero. Although these filtered separation matrices are non-invertible matrices, the inversion of the separation matrix can be computed or approximated to transform the data back into the original observation space, thus removing the unwanted source(s) from the original signal. By way of example, PCA or ICA can estimate the inverse of a mixing matrix A: $W \approx A^{-1}$, which is then used to transform the data back into an estimate of the source space. Source(s) that are not of interest are discarded by setting corresponding N-p column(s) of the inverse of the demixing matrix $W^{-1}$ to zero (to produce filtered demixing matrix $W_p^{-1}$), and then projecting the data back into the observation space using the filtered demixing matrix $W_p^{-1}$ to produce a filtered version of the original data.

In PCA aspects, methods seek component vectors $y_1, y_2, \ldots, y_N$ that derive from the maximum variance provided by N linearly transformed component signals. In one aspect, the first principle component can be computed by maximizing the value of $v_1 = \arg\max_{\|v\|=1} E\{(v_1^T X)^2\}$, where $v_1$ is the same length M as the data X. Thus, the first principal component is the projection on the direction in which the variance of the projection is maximized. Each of the remaining N−1 principal components are found by repeating this process in the remaining orthogonal subspace. The transformation of the columns of X onto each $v_i^T = v_i^T X$; i=1, . . . , N) can be implemented via the Karhunen-Loeve transform or the Hotelling transform.

In some aspects, the computation of the $v_i$ can be accomplished using the sample co-variance matrix $C = X^T X$, where C is an M×M matrix, and the $v_i$ are the eigenvectors of C, which correspond to its N eigenvalues. Aspects can employ Singular Value Decomposition (SVD), for example.

An M×N observation matrix can be decomposed as $$X = USV^T$$

where S is an M×N non-square matrix with zero values except non-zero values $s_i = \sqrt{\lambda_i}$ (where $\lambda_i$ are the eigenvalues of $C = X^T X$) on its leading diagonal $s_i = S_{MN}, M = N$ and arranged in descending order of magnitude.

Eigenvalues express the amount of energy projected along their corresponding eigenvectors. In some aspects, large eigenvalues indicate eigenvectors that are regarded as the desired signal(s) and small eigenvalues indicate eigenvectors that are regarded as noise in the desired signal(s). In such aspects, a truncated SVD of X can be performed such that only the most significant (e.g., the p largest) eigenvectors are retained.

In some aspects of the disclosure, a truncated SVD corresponding to a sparse update to X is performed, such as whereinp corresponds to update eigenvectors. The truncated SVD is expressed as:

$$Y = US_p V^T$$

where Y is an M×N matrix, which can be referred to as a filtered matrix. Y can be an update matrix (e.g., a partial-update matrix, such as a sparse matrix) or an updated matrix in accordance with the disclosed aspects.

In one aspect, the time-invariant channel is described as $$y = Hx + w$$

where $x \in \mathbb{C}^{n_t}$ is the transmitted signal, $y \in \mathbb{C}^{n_r}$ is the received signal, $H \in \mathbb{C}^{n_r \times n_t}$ is the channel matrix, and $w \sim \mathbb{C} N(0, N_0 1_{n_r})$ is white Gaussian noise. The channel gain from transmit antenna j to receive antenna i is expressed as $h_{ij}$. The matrix H has a singular value decomposition:

$$H = USV^*$$

where $U \in \mathbb{C}^{n_r \times n_r}$ and $V \in \mathbb{C}^{n_t \times n_t}$ are rotation unitary matrices, and $S \in \mathbb{R}^{n_r \times n_t}$ is a rectangular matrix whose diagonal elements are non-negative real numbers and whose off-diagonal elements are zero. The diagonal elements are the ordered singular values $\lambda_1 \geq \lambda_2 \geq \ldots > \lambda_n$, where $n = \min(n_t, n_r)$ is the number of singular values. Each $\lambda_i$ corresponds to an eigenmode of the channel (also called an eigenchannel). Each non-zero eigenchannel can support a data stream. Thus, the MIMO channel can support the spatial multiplexing of multiple streams. In some aspects, the observation matrix X is an estimate of the channel matrix H.

Figure 4A:
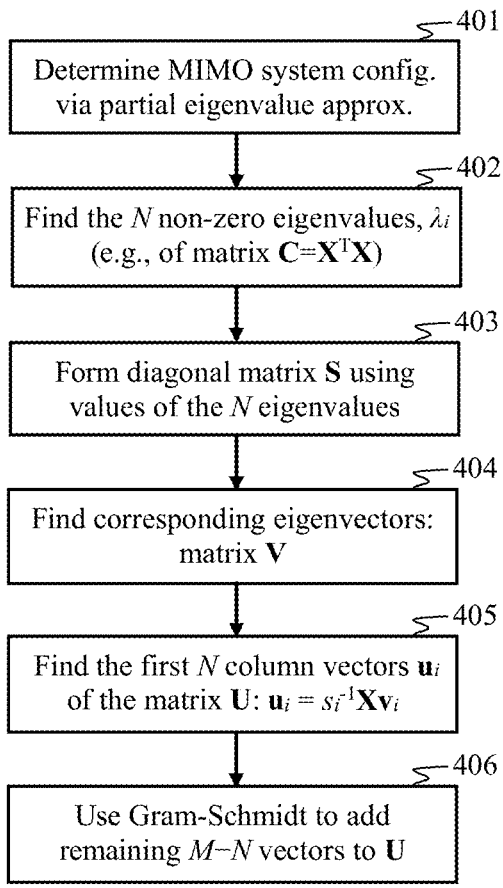
FIG. 4A is a block diagram that depicts apparatus, method, computer program product aspects in which features of the disclosure can be implemented.

FIG. 4A is a block diagram that depicts apparatus and method aspects in which features of the disclosure can be implemented. For example, one or more candidate MIMO system configurations can be selected 401 by performing a partial eigenvalue approximation (i.e., a subset less than the total number N of eigenvalues is computed for at least one of the candidate configurations), and selecting the one or more candidates based on MIMO performance computed from the subsets. By way of example, but without limitation, a MIMO system configuration is selected, and its corresponding observation matrix X is processed. The N non-zero eigenvalues, $\lambda_i$, are computed 402, which may include ED or SVD. By way of example, eigenvalues of the matrix $X^T X$ are computed. A (non-square) diagonal matrix S is created 403, such as by placing the square roots $s_i$ of the N eigenvalues in descending order of magnitude on the leading diagonal and setting all other elements of S to zero. The orthogonal eigenvectors of the matrix $X^T X$ corresponding to the obtained eigenvalues are generated 404, and the eigenvectors can be arranged in the same order as the eigenvalues. This collection of column vectors is the matrix V. The first N column vectors $u_i$ of the matrix U can be computed 405 according to $u_i = s_i^{-1}$ (i=1, . . . , N). Gram-Schmidt orthogonalization may be performed 406 to add the remaining M−N vectors to the matrix U. The selected MIMO system configuration(s) can now be used for spatial multiplexing (e.g., precoding transmission signals and/or subspace processing of received signals).

Figure 4B:
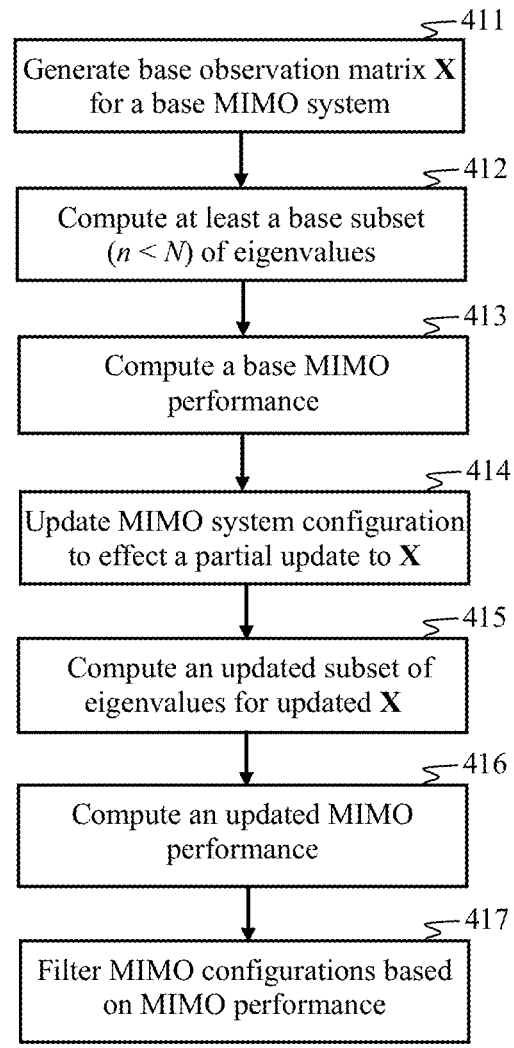
FIG. 4B is a block diagram of some apparatus, method, computer program product aspects that provide for determining at least one MIMO system configuration via partial eigenvalue approximation.

FIG. 4B is a block diagram of some method and apparatus aspects that provide for determining at least one MIMO system configuration via partial eigenvalue approximation. For a base MIMO system configuration, a base observation matrix can be X is generated 411. A base subset of the total number of eigenvalues for X or $C = X^T X$ can be generated 412. A base MIMO performance that is a function of the base subset of eigenvalues can be computed 413. The MIMO system configuration can be updated to effect a partial update to the base observation matrix X 414. An updated subset of eigenvalues corresponding to updated base observation matrix X can be computed 415. An updated MIMO performance corresponding to the updated base observation matrix X can be computed 416.

The aforementioned steps can be performed multiple times for generating multiple candidate MIMO system configurations. Multiple base MIMO system configurations may be generated. Pipelined or parallel processing may be employed in any of the disclosed aspects. Pipelined or parallel processing may be used in 411-413, such as to provide multiple candidate base MIMO system configurations. Pipelined or parallel processing may be used in 414-416 to provide multiple concurrent update paths corresponding to the same base MIMO system configuration, such as to provide multiple candidate updated MIMO system configurations. In step 417, the candidate MIMO system configurations are filtered, such as to select at least one configuration with the best MIMO performance.

The base observation matrix 411 can comprise signal measurements from individual antennas of any antenna array, including (but not limited to) Massive MIMO arrays, distributed antenna system, mobile antenna systems, Cooperative-MIMO systems, and airborne relays. The base observation matrix 411 can comprise signal estimates for real and/or virtual antennas. In one aspect, a signal estimate for a virtual antenna is computed by extrapolating signal measurements between nearby real antennas. The base observation matrix 411 can comprise measurements of known and/or unknown transmission signals received by the antenna array. The base observation matrix 411 can comprise channel estimates, such as CSI. The base observation matrix 411 can comprise real-time measurements and/or historical data. In some aspects, the base observation matrix 411 comprises signal estimates computed from a channel model and known transmitter data (such as transmitter geo-spatial location, transmitter movement, transmit power, physical waveform parameters of the transmitted signals, each transmitter's antenna beam pattern, polarization, antenna spacing, data service requirements (e.g., latency tolerance, reliability, quality of service, bandwidth, control-signaling overhead, etc.). The base observation matrix 411 can comprise a prediction of transmitter activity, such as forecasted transmitter geo-spatial locations, transmitter movement, transmitter density, spectrum occupancy, network load, data service requirements, local channel conditions, and the like.

In some aspects, the base observation matrix 411 comprises signal estimates based on real and/or virtual receiver array configurations. The base observation matrix 411 can be generated using a receiver array model based on channel models and receiver data based on available receiver antennas. The receiver data can comprise antenna beampattern information (e.g., gain, directionality, polarization, antenna spacing, etc.), receiver geo-spatial location, receiver movement, and any of various receiver metadata. The base observation matrix 411 can comprise prediction models, including predictive channel models (e.g., spectrum occupancy, co-channel interference, multipath, etc.), receiver availability, receiver geo-spatial location, receiver movement, and any of various receiver metadata.

In MIMO performance analysis (such as the combination of 412 and 413, and the combination of 415 and 416), any of various blind or semi-blind analysis techniques can be used to determine the MIMO performance for each candidate MIMO system configuration. The received signals, the channel matrix, and/or covariances thereof can be employed. ED or SVD can be employed to determine the eigenvalues. Any of various numerical approximation techniques for computing the eigenvalues that are pertinent to the MIMO performance evaluation can be employed to a desired precision. In one aspect, eigenvalue computations 413 corresponding to a base MIMO system configuration are approximated to higher precision than eigenvalue computations 415 for corresponding updated configurations.

In some aspects, eigenvalue computation 415 is data-driven in the sense that a coarse approximation of eigenvalues corresponding to a given candidate MIMO system configuration may be performed followed immediately by MIMO performance computation 416. If 416 indicates reduced MIMO performance, the candidate may be disqualified (e.g., discarded) 417, and a new update to the system may be effected 414. Otherwise, control may return to 415 to refine the approximation to a higher degree of precision. MIMO performance based on the refined eigenvalue approximation may be performed 416, followed by filtering 417.

In some aspects, PCA is employed wherein variance is used to determine a set of orthogonal axes, and the eigenvalues express the amount of energy projected along those axes, which relates to MIMO performance in a given MIMO system configuration. ICA may employ kurtosis (or some other measure of non-Gaussianity) to determine axes. Accordingly, disclosed aspects may be configured to employ higher moments (such as, but not limited to kurtosis) to analyze partial updates to a MIMO system, and to employ computations of a partial (e.g., reduced) set of the metrics corresponding to the higher moments to compute the corresponding MIMO performance.

In one aspect, the eigenvalues satisfy the expression: $(C-\lambda I)=0$, wherein the specific eigenvalues $\lambda_i$ are the solution to the characteristic equation for $\lambda$. In a MIMO system, X can be a complex $N_r \times N_t$ matrix of channel coefficients, wherein matrix value $X_{ij}$ represents the channel coefficient from transmitter j to receiver i. The suitability of a MIMO wireless system for spatial multiplexing is largely dependent on the characteristics of the wireless channel and the antenna configuration. MIMO performance can be understood to comprise various definitions, including capacity, probability of outage, channel correlation, orthogonality, as well as others, which can be expressed as functions of the eigenvalues.

By way of example, a figure of merit, such as the condition number, can indicate the SNR required to recover a MIMO transmission over a selected wireless channel. Thus, the condition number is regarded as a measurement of channel matrix quality in MIMO. If a matrix, such as matrix H (or any of the other matrices disclosed herein), is non-singular, its condition number is $$\kappa(H)=\|H\|\|H^{-1}\|$$

where $\|*\|$ denotes the matrix norm. A system of linear equations is "well-conditioned" if small errors in the matrix coefficients result in small errors in the solution. A system of linear equations is "ill-conditioned" when small errors in the coefficients may have a large detrimental effect on the solution. The condition number is a traditional and deterministic calculation formed by taking the ratio of the maximum to minimum singular values of the matrix. Small values for the condition number imply a well-conditioned channel matrix while large values indicate an ill-conditioned channel matrix. A well-conditioned matrix will have approximately equal singular values, and the condition number will be low-typically less than 10 dB. The ideal condition number is equal to one, or 0 dB.

The condition number can provide an indication as to whether the MIMO channel is capable of supporting spatial multiplexing and is a short-term indication of the SNR required to properly recover a MIMO transmission. When the condition number is greater than 10 dB, data recovery at the receiver becomes progressively more sensitive to errors in the measured channel coefficients resulting from additive white Gaussian noise (AWGN), quantization noise, and other interference present in the system. In the high SNR regime, the less spread out the singular values are, the higher the capacity is.

Aspects disclosed herein can comprise computing how a given partial update to antenna selection in a MIMO system (transmit and/or receive, for example) affects $\|H\|$ and/or $\|H^{-1}\|$ via direct and/or indirect mathematical relationships. If $G=HH\dagger$, where "$\dagger$" denotes the transposed complex conjugate, and G has minimum and maximum eigenvalues, $\lambda_{min}$ and $\lambda_{max}$, the condition number can be expressed as $$\kappa(H) = \sqrt{\frac{\lambda_{max}}{\lambda_{min}}}$$

Thus, some aspects of the disclosure provide for determining how each partial update to a MIMO antenna array changes the eigenvalues, such as a subset comprising $\lambda_{min}$ and $\Delta_{max}$, (and, thus, the condition number) of a previous MIMO antenna array. The changes to the eigenvalues can be computed to indicate whether the eigenvalues increase or decrease, and possibly include some estimate of the magnitude of the change. Corresponding changes to condition numbers can be computed.

These changes can be computed using low-precision numerical methods, such as to effect an initial filtering of the candidate set of MIMO antenna selections. For example, candidate antenna selections corresponding to partial updates that improve the condition number might be retained.

Candidate antenna selections corresponding to improvements above a threshold value might be retained, whereas those candidates below the threshold are discarded. Next, higher-precision numerical methods (such as for eigenvalue estimation) might be performed on the resulting filtered set of candidate antenna arrays to effect subsequent filtering.

In one aspect, a partial update 414 to a MIMO antenna array can be selected by determining the resulting change to one or more individual values in the corresponding channel matrix, and then based on a mathematical relationship that expresses how the change to each individual value affects one or more of the eigenvalues values, select one of a set of candidate partial updates that results in the best MIMO performance. The relationship between changes in the channel matrix and the resulting changes in the eigenvalues (such as just the subset, $\lambda_{min}$ and $\lambda_{max}$), and thus, the condition number, might be learned using supervised and/or unsupervised learning in an artificial intelligence system (e.g., some type of machine-learning system, such as a deep learning neural network). The aforementioned filter techniques may be employed in the classifier and/or filters in a neural network.

In one aspect, 414 comprises determining which partial updates are likely to affect the eigenvalues in a way that improves the MIMO performance. For example, this can comprise an update to a row and/or column of C or X, such as by appending a new row or column, deleting an existing row or column, or changing values in an existing row or column (such as a combination of deleting and adding rows or columns). In a MIMO system, this can comprise selecting and/or de-selecting a transmit antenna and/or selecting and/or de-selecting a receive antenna. This can comprise selecting and/or de-selecting a transmit antenna's and/or selecting and/or de-selecting a receive antenna's contribution to C or X. A partial update might be effected wherein a row or column of C or X is set to zero, and the resulting change in the eigenvalue(s), $\lambda_i$, is (are) computed. In a MIMO system, this can comprise de-selecting a transmit and/or receive antenna, such as to reduce the number of antennas (i.e., antenna de-selection) while maintaining a MIMO performance threshold.

In related aspects, the system can learn features in the data matrix that correlate with a good condition number. In related aspects, the system can learn features related to changes in the data matrix that correlate with improving the condition number. The learning mode can employ the disclosed techniques. For example, a partial update to the data matrix may be performed, and a cost function that includes a MIMO performance may be implemented in a feature-learning mode, wherein the MIMO performance is a function of fewer than the total number of eigenvalues. The computational complexity of the eigenvalue computations can be reduced by selecting a precision for the computations based on the filtering, wherein a lower precision is employed for eigenvalues corresponding to MIMO system configurations to be deselected, or discarded.

An online mode can employ learned data features to filter a set of candidate data matrices, such as to provide a set of at least one filtered (i.e., selected) data matrix. The at least one filtered data matrix can be processed according to the disclosed aspects. A learning mode may be employed using the at least one filtered data matrix. In some aspects, the at least one filtered data matrix is employed as at least one base data matrix to which partial updates can be made to generate additional candidate data matrices. The eigenvalues of a base data matrix may be computed with higher precision than eigenvalues corresponding to updated versions of the base data matrix.

The resulting change in one or more of the eigenvalue(s) (or a function of the eigenvalues that indicates MIMO performance) is computed (such as compared to a threshold value) in a decision process. Adding a MIMO antenna may be conditioned on the corresponding performance increase being above a threshold value. Removing a MIMO antenna may be conditioned on the corresponding reduction in MIMO performance being below a certain threshold value. Swapping one MIMO antenna for another may be conditioned on the corresponding performance increase being above a threshold value. The process of selection (and/or de-selection), evaluation, and decision can be repeated according to one or more criteria, such as (but not limited to) run time, a predetermined maximum number of iterations, number of antennas, MIMO performance threshold value, and/or MIMO channel rank.

Figure 4C:
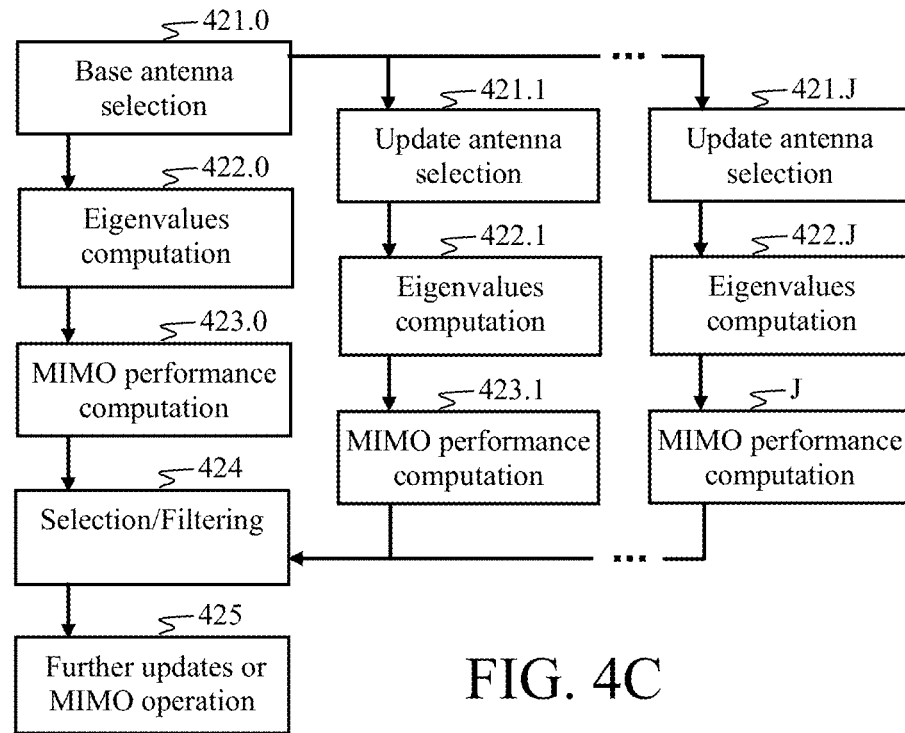
FIG. 4C is a block diagram that depicts apparatus, method, computer program product features according to some aspects of the disclosure.

FIG. 4C is a block diagram that depicts apparatus and method features according to some aspects of the disclosure. A base MIMO system configuration (such as an antenna selection) 412.0 is made, and eigenvalues are computed therefrom 422.0. A MIMO performance computation is made 423.0 based on the eigenvalues. One or more (e.g., J) update paths may be implemented, such as in parallel, in a pipelined architecture, or some combination thereof. A first update path comprises updating the antenna selection 421.1, performing a corresponding eigenvalue computation 422.1, and computing a MIMO performance therefrom 423.1. A $J^{th}$ update path comprises updating the antenna selection 421.J, performing a corresponding eigenvalue computation 422.J, and computing a MIMO performance therefrom 423.J. Eigenvalue computations (e.g., any of 422.0-422.J) may be performed in parallel and/or via pipelined processing. MIMO performance computations generated by 423.0-423.J are processed by Selection/Filtering 424, such as to reduce the number of candidate MIMO system configurations in a set comprising at least the updated configurations, and may further include the base configuration. For example, one or more "best" configurations may be selected in 424. In one aspect, the one or more selected configurations may be used as a base configuration for subsequent updating, eigenvalue computation, MIMO performance computation, and selection/filtering, or the selected configuration(s) may be used for MIMO transmission and/or reception 425.

In some aspects, MIMO performance computation 423.0-423.J can comprise other performance metrics, such as power efficiency, which may be inferred by a peak-to-average power ration (PAPR) computation. In such aspects, the computation of the corresponding discrete-time signal to be measured for PAPR may be updated according to the partial update methods disclosed herein and/or may include any of the matrix expansion and update techniques disclosed in U.S. Prov. Appl. Nos. 62/778,894 and 62/686,083, which are incorporated by reference in their entireties.

With reference to the eigenvalue computation, autocorrelation is defined as $$R_{XX}(t_1,t_2)=E\{X(t_1)X^*(t_2)\}$$

where E is the expectation operator, and X has a mean $\mu_X=E[X]$

The autocovariance is given by $$C_{XX}(t_1,t_2)=E\{[X(t_1)-\mu_X(t_1)][X^*(t_2)-\mu_X^*(t_2)]\}$$

Thus, autocorrelation and autocovariance are related:

$$C_{XX}(t_1,t_2)=R_{XX}(t_1,t_2)-\mu x(t_1)\mu x^*(t_2)$$

In the case of zero mean, autocorrelation and autocovariance are the same.

Some aspects provide for ED of the autocorrelation (or covariance) matrix, and some aspects provide for SVD of a data matrix.

In practice, R can be estimated by $R=XX^H$, where X is the data measurement matrix. In some aspects, X comprises measurements of known data transmissions, such as pilots, training symbols, known data symbols, estimated data symbols, and the like. Thus X can comprise a measured or computed channel matrix H.

An alternative to the eigendecomposition of the autocorrelation matrix is the SVD of X; the M singular vectors corresponding to the M largest singular values form an M-rank matrix, which best approximates X in a least-squares sense. Thus, ED and SVD can give the same subspace estimate:

$$\text{If } X=VSU^H, \text{ then } R=XX^H=VS^2V^H$$

In some disclosed aspects, a MIMO antenna selection can be updated by performing recursive updates to subspace estimates for predetermined or data-driven antenna selections. For example, updates to the decomposition (ED or SVD) can be made for each of a set of candidate antenna selections. In disclosed aspects, as an alternative to performing full updates to the decomposition for each candidate antenna selection, the candidate antenna selections can be filtered (i.e., the candidates are removed or retained) based on a less computationally complex approach in which updates to the eigenvalues (or a subset of the eigenvalues) are estimated for each update to the antenna selection. In such aspects, the subset of eigenvalues corresponds to a MIMO performance metric.

Antenna selection updates to the MIMO antenna array can comprise updates to the data matrix. This can constitute partial updates to a MIMO receiver array and/or a MIMO transmitter array, or may simply model these updates. In one aspect, a recursion is implemented wherein an L×(n−1) data (e.g., observation) matrix $X_{n-1}$ is updated by inserting an update $x_n$ into the $n^{th}$ column of the data matrix:

$$X_n = +x_{n-1}+x_n e_n^T$$

where $e_n$ is the $n^{th}$ column of the n×n identity matrix. In some aspects, the dimension of matrix $X_n$ can be increased until a predetermined criterion is met, such as maximum dimension, rank, condition number, and/or when subsequent dimensions lie within the noise subspace. In some aspects, each update to the observation matrix can be approximated as $$X_n = \alpha X_{n-1}+\beta x_n e_n^T$$

where $\alpha$ and $\beta$ are scaling factors that are less than one, and the operations disclosed herein can be adapted to accommodate these scaling factors. In some aspects, $X_{n-1}$ and $x_n$ comprise weight values, such as beamforming or precoding weights. The weight values may be updated.

In some aspects, the data matrix can be updated by removing columns:

$$X_{n-1}=X_n-x_1 e_1^T$$

Subtracting data can lead to ill-conditioning, since the smallest eigenvalues may move toward zero. Thus, it can be advantageous to learn (such as via machine learning or other artificial intelligence techniques) which columns or rows, if removed, are likely to reduce the smallest eigenvalue(s) so some updates can be avoided. Operations that reduce the smallest eigenvalue(s) may be avoided upon the condition that one or more of the smallest eigenvalues are below a threshold value. $X_n$ and $x_1$ can comprise weight values, such as beamforming or precoding weights. In some aspects, one or more values in a column can be updated. Updates to the data matrix can model how channel conditions change with time. In some aspects, this change in channel conditions can be due to movement of the MIMO antennas.

In some aspects, the column(s) to be removed is (are) determined via some computation of its effect on MIMO performance, such as may be implemented via artificial intelligence (e.g., a deep-learning neural network). This can constitute antenna de-selection (removal) from the MIMO array. A column to be removed or replaced can be moved in the X matrix to the edge of the window. In some aspects, the column(s) to be added is (are) determined via some computation of its effect on MIMO performance, such as may be implemented via artificial intelligence (e.g., a deep-learning neural network). This can constitute antenna selection (e.g., addition) to the MIMO array.

In aspects that employ the autocorrelation matrix R, the recursive update can be implemented as:

$$R_n=R_{n-1}+x_n x_n^H$$

It should be appreciated that the recursive update may comprise scaling factors, such as a and ft described above, and the following description can be adapted accordingly.

$R_{n-1}$ can be decomposed as $$V_{n-1}=V_{n-1}D_{n-1}V_{n-1}^H$$

Thus, $$R_n=V_{n-1}[D_{n-1}+v_{n-1}^H v_n V_n^H]v_{n-1}^H$$

where $V_n=[v_1, \ldots, v_n]$ is the matrix span of the subspace. $V_n$ and $D_n$ can be computed such that $R_n=V_n D_n V_n^H$. The problem can be reduced to $$D_{n-1}+vv^H=U_n D_n D_n^H$$

$V_n$ can be computed once $U_n$ is obtained: $V_n=V_{n-1}U_n$.
The eigenvalues A can be computed from:

$$\sum_{i=1}^{N-1}\frac{|v^T e_i|^2}{\lambda-d_i}+\frac{1}{\lambda}\sum_{i=N}^{L}|v^T e_i|^2=1$$

Where N−1 is the number of non-zero elements in $D_{n-1}=\text{Diag}\{d_i|i=1,\ldots,N-1;d_N=0\}$, and $e_i$ is the $i^{th}$ column of the identity matrix. Each new eigenvalue is inside a well-defined interval, and all the intervals are disjoint. This algorithm can be performed via parallel computations, and can be employed in parallel processing architectures. In some aspects, this algorithm can be employed in a pipelined processor configuration.

To solve for the eigenvalues, any of various techniques may be employed (e.g., J. R. Bunch, C. P. Nielsen and D. C. Sorensen, "Rank-one modification of the symmetric eigenproblem", Numer. Math., Vol. 26, 1978, pp. 26-48. J. R. Bunch and C. P. Nielsen, "Updating the singular value decomposition", Numer. Math., Vol. 26, 1978, pp. 111 124. R. D. Degroat and R. A. Roberts, "Efficient, numerically stabilized rank-one eigenvalue updating", IEEE Trans. Acoust. Speech Signal Process., Vol. 38, No. 2, February 1990, all of which are incorporated by reference in their entireties), including the Newton-Raphson algorithm. In numerical analysis, the Newton-Raphson method, also known as Newton's method, is a method for finding successively better approximations to the roots (or zeroes) of a real-valued function. It is one example of a root-finding algorithm that can be employed in the disclosed aspects.

The Newton-Raphson method can be used as follows: it starts with an initial guess which is reasonably close to the true root, then the function is approximated by its tangent line (which can be computed using the tools of calculus), and one computes the x-intercept of this tangent line (which can be done with elementary algebra). This x-intercept will typically be a better approximation to the function's root than the original guess, and the method can be iterated.

Any of the various forms of spectrum-slicing algorithms can be performed to approximate certain ones of the eigenvalues. Using knowledge of the original spectrum, eigenvalues of a partial update can be localized to disjoint intervals. A computationally efficient algorithm can be used to locate the eigenvalues to a desired accuracy. An approximation of MIMO performance, such as condition number, is then performed based on the computed eigenvalue(s). Based on the effect of each corresponding antenna selection update on the MIMO performance, candidate antenna sets can be selected and/or de-selected. A coarse estimate (e.g., lower accuracy) of the eigenvalues (and thus, the MIMO performance) can be performed to filter the set of candidate antenna selections. Subsequent steps can employ finer estimates (e.g., higher accuracy) of the eigenvalues (and thus, the MIMO performance) to effect subsequent filtering of the set, and can be used to compute eigenvectors.

Specific ones of the eigenvalues can be computed in this manner, such as the max and min eigenvalues that comprise the condition number computation. In some aspects, the computation determines only if one or two particular eigenvalues increase or decrease, such as to determine if the corresponding condition number increases or decreases. In some aspects, a coarse measure of the magnitude of change in at least one particular eigenvalue is computed, such as to determine a coarse estimate of magnitude change in the corresponding condition number. A coarse estimate can be used to discard a candidate MIMO configuration. If the candidate MIMO configuration warrants further consideration, refinement of the eigenvalue computations to a higher precision can be performed.

In one aspect, X is an L×K matrix, $x_1$ is a column (e.g., the first column) of $X_{n-1}$, $x_n$ is an update column, and P is a K×K permutation matrix obtained from the identity matrix by a unity circular permutation of its columns. An updated matrix $X_n$ is expressed as the recursion:

$$X_n = X_{n-1}P + v_n e_K^T$$

where $v_n = x_n - x_1$, and $e_K$ is the $K^{th}$ column of the identity matrix. The SVD of $X_{n-1}P$ can be computed from the SVD of $X_{n-1}$. These updates may be effected by adding a dyad, and can be represented as a moving window function.

In aspects that employ the autocorrelation matrix R, the recursive update can be implemented as:

$$R_n = R_{n-1} + X_n X_n^H - X_1 X_1^H$$

In some aspects, the recursive update can be implemented as:

$$R_n = \alpha R_{n-1} + \beta x_n x_n^H - \alpha x_1 x_1^H$$

where $\alpha$ and $\beta$ are optional scaling factors. This leads to $$\alpha D_{n-1} + \beta v v^H - \alpha w w^H = U_n D_n U_n^H$$

where v and w are the transforms of $v_n$ and $w_n$ by the eigenmatrix. The new eigenvalues are the solution to:

$$\alpha\beta|(v^T F w)|^2 + [1 - \beta(v^H F v)] \times [1 + \alpha(w^H F w)] = 0$$

where $F = [\lambda I - \alpha D]^{-1}$. A solution to this equation can employ a partial fractional decomposition. The eigenvectors can be computed from $$u = \beta F v - \alpha \rho F w$$

where $$\rho = \frac{[1 - \beta(v^H F v)]}{\alpha(v^T F v)}$$

Some aspects can employ a sliding window, which is analogous to short-time signal analysis, wherein data inside the window is stationary. This can correspond to simultaneously adding a row and deleting a row from the data matrix. This can be implemented as the rank-2 matrix update:

$$R_n = R_{n-1} + x_n x_n^H - x_1 x_1^H$$

where $x_n$ is the data vector to be added and $x_1$ is the data vector to be deleted. This can be generalized to deleting k rows and appending k rows to the data matrix $X^H$, which leads to a rank-2k modification.

In some aspects, the eigenvalues can be computed explicitly. In other aspects, the updates to one or more eigenvalues can be estimated, such as via numerical approximation. Adding and deleting blocks of data can be implemented as a generalized rank-k modification problem. Further aspects can employ weighting factors to the generalized rank-k modification problem to provide a relative weight to the previous covariance matrix and the new data vector for developing the new covariance matrix estimate. Disclosed aspects can employ efficient algorithms to eigenvalue search in order to mitigate the computational complexity of performing nonlinear searches for eigenvalues upon each rank-one update. By way of example, the spectrum-slicing theorem can be applied to locate a set of eigenvalues (such as the smallest and largest eigenvalues) to a desired (e.g., selectable) accuracy, such as by means of a reduced-size Hermitian matrix whose elements depend on the eigenvalue parameter. This can be used to update the eigen-decomposition of the covariance matrix. If only the principle eigenvalues and eigenvectors are monitored, the noise eigenvalue multiplicity can enable a highly efficient algorithm. The nonlinear search for eigenvalues can be performed in parallel and/or in an efficient pipelined processor architecture, and some aspects provide for searching over a subset (e.g., smallest and/or largest) of the eigenvalues.

An update-eigenvalue model in accordance with one aspect provides for computing the eigensystem of the modified Hermitian matrix based on knowledge of the eigensystem of a previous matrix:

$$\hat{R} = R + \Delta$$

where $\hat{R} \in \mathbb{C}^{N \times N}$ and $R \in \mathbb{C}^{N \times N}$ are the modified and original covariance matrices, and $\Delta \in \mathbb{C}^{N \times N}$ is the additive update matrix. $\Delta$ may be a sparse update matrix. In some aspects, $\Delta$ may be indefinite, as it may have negative eigenvalues corresponding to downdating.

In one aspect, the rank of $\Delta$ is k, wherein k<N, and $\Delta$ is Hermitian, so its weighted outer-product expansion is $\Delta = USU^H$, where $U \in \mathbb{C}^{N \times k}$, and $S \in \mathbb{R}^{k \times k}$ is a nonsingular matrix. In the eigenvalue and eigenvector expansion of A, S is a diagonal matrix with eigenvalues on the diagonal, and U is the corresponding orthonormal eigenvector matrix. In one aspect, the decomposition of A is expressed in terms of the data, wherein the diagonal elements of S are ±1, corresponding updating (+) or downdating (−), and U is the matrix comprising corresponding data vectors.

The EVD of R is assumed to be known $$R=QDQ^H$$

where $D \in \mathbb{R}^{N \times N}$, $Q \in \mathbb{C}^{N \times N}$, $D=\text{diag}[d_1, \ldots, d_N]$ is the diagonal eigenvalue matrix, and $Q=[q_1, \ldots, q_N]$ is the orthonormal eigenvector matrix.

The eigenvalues are the solution for the zeros of $\det[\hat{R}-\lambda I]=0$, which can be expressed as $$(R-\lambda I)x+USU^Hx=0$$

which can be expressed as $$(R-\lambda I)x+Uy=0$$

and $$U^Hx+S^{-1}y=0$$

using the substitution, $y=SU^Hx$, $y \in \mathbb{C}^k$.

Solving x in terms of y, and performing its substitution yields $W(\lambda)y=0$, where $$W(\lambda)=S^{-1}+U^H(R-\lambda I)^{-1}U$$

$W(\Delta)$ is the Schur complement of $R-\lambda I$ in $M(\lambda)$:

$$M(\lambda) = \begin{vmatrix} R-\lambda I & U \\ U^H & -S^{-1} \end{vmatrix}$$

Thus, the modified eigenvalues can be computed from the solutions of $\det[W(\lambda)]=0$. Thus, $$\det[W(\lambda)] = (-1)^k \frac{\det[M(\lambda)]}{\det[R-\lambda I]} = (-1)^k \frac{\prod_{i=1}^{N}(\hat{\lambda}_i - \lambda)}{\prod_{j=1}^{N}(\lambda_j - \lambda)}$$

Where $\lambda_j \in \lambda(R)$ and) $\hat{\lambda}_i \in \lambda(\hat{R})$ are the zeros as poles (respectively) of the rational polynomial $\det[W(\lambda)]$. This derivation holds for when the eigenvalues of R and $\hat{R}$ are distinct. However, a deflation procedure can be used when some of the eigenvalues of the previous and updated matrices are the same. $W(\lambda)$ is a much smaller dimension (k×k) than $\hat{R}-\lambda I(N \times N)$.

Some aspects can employ a fast algorithm based on the spectrum-slicing theorem that relates eigenvalues of the updated matrix to eigenvalues of the previous matrix, and localizes the search within one or more intervals, which in the case of multiple intervals, can be performed in parallel.

In some aspects, deflation may be performed prior to spectrum slicing such that all $d_i$ values are distinct. Deflation may be performed when the update vector contains zero-valued elements, when U is orthogonal to q, or when the previous (e.g., original) covariance matrix has multiplicities of eigenvalues. For example, if eigenvalue λ has multiplicity m with the corresponding set of eigenvectors $Q=[q_1, \ldots, q_m]$, a Householder transformation can be performed on Q such that the last M−1 eigenvalues are orthogonal to $u_1$, where $U=[u_1, \ldots, u_k]$.

Assuming all $d_i$ values are distinct, a computationally efficient spectrum-slicing algorithm can be used to locate eigenvalues to any desired (e.g., selectable) accuracy. The computational complexity can be further reduced by locating only a subset of the eigenvalues. In some aspects, computing a few of the largest eigenvalues (or largest singular values when operating on the data matrix directly) and associated eigenvectors can be performed, such as to approximate a linear hermitian operator by another of lower rank. In one aspect, the hermitian matrix varies by a rank one modification from one candidate antenna selection set to the next. In some aspects, the smallest eigenvalue may be of interest (or equivalently the smallest singular value when operating on the data matrix directly). In aspects in which the condition number is of interest, the largest and smallest eigenvalues are the subjects of the localized eigenvalue search.

One aspect employs the spectrum-slicing formula:

$$N_{\hat{R}}(\lambda)=N_R(\lambda)+D^+[W(\lambda)]-D^+[S]$$

Where $N_{\hat{R}}(\lambda)$ and $N_R(\lambda)$ are the number of eigenvalues of $\hat{R}$ and R less than λ (respectively), $D^+[W(\lambda)]$ is the positive inertia of $W(\lambda)$ (i.e., the number of positive eigenvalues of $W(\lambda)$), and $D^+[S]$ is the positive inertia of S. $W(\lambda)$ can be computed for each value of λ or for only selected values. $Q^HU$ may be computed initially and stored for use in subsequent iterations. The inertia of $W(\lambda)$ can be computed using an $LDL^H$ or diagonal pivoting factorization. $N_R(\lambda)$ is known from the EVD of R. $D^+[S]$ can be determined from the EVD of A or from counting the number of data vectors to be added. Since the spectrum-slicing formula provides a count of the eigenvalues in any interval, the search can be localized in a similar manner as Sturm sequence/bisection techniques used in polynomial root finding (e.g., as in B. N. Parlett, The Symmetric Eigenvalue Problems. Englewood Cliffs, N.J.: Prentice-Hall, 1980, which is incorporated by reference).

In one aspect, a method is employed wherein knowledge of the previous (e.g., original) spectrum is used according to the spectrum-slicing formula to localize eigenvalues (e.g., max and min eigenvalues) to disjoint intervals. For each iteration of an eigenvalue search in the interval (l,u), set $\lambda=(l+u)/2$ and test it with the spectrum-slicing formula for $N_{\hat{R}}(\lambda)$. This can be repeated until it converges to the desired accuracy. In some aspects, bisection may be employed to find an interval that contains a single eigenvalue, and then a rapid root-finding scheme (such as a secant method) can be used to speed up the convergence rate to precisely locate the eigenvalue. Multiple eigenvalues can be computed in parallel in this manner.

Aspects disclosed herein can search for a subset less than the full set of eigenvalues, the subset being used for estimating MIMO performance of each candidate MIMO antenna array. For example, the subset may comprise eigenvalues used to compute the condition number. These eigenvalues may be maximum and minimum eigenvalues. Once the eigenvalues are found, the MIMO performance (such as the condition number) can be computed. Each candidate MIMO antenna array can comprise a partial update (e.g., a change in the selection of n antennas of the N-element array, where n<<N). The candidate antenna selections may be predetermined or data-driven. In some aspects, the gradient of MIMO performance between candidate antenna arrays may be used to select a subsequent candidate set.

In aspects that employ neural networks, learning can include a cost (or loss) function that is a function of the observations and may employ MIMO performance, such as the condition number (which may be computed from the minimum and maximum eigenvalues). The cost function may be adapted based on the learning type (e.g., supervised, unsupervised, reinforcement, etc.). Disclosed techniques can be employed in such applications, such as computing the eigensystem of a modified Hermitian matrix (e.g., of a corresponding updated antenna selection) based on knowledge of the eigensystem of a previous Hermitian matrix (e.g., of a corresponding previous antenna selection). A deep learning neural network can be discriminately trained (e.g., learn how to classify based on a discriminative or conditional model) with any backpropagation algorithm. For example, backpropagation may calculate the gradient of the loss function with respect to weights. Weight updates can be performed via stochastic gradient descent, for example.

The optimization algorithm can iterate propagation and weight updates. When an input vector is presented to the network, it is propagated forward through the network, layer by layer, until it reaches the output layer. The output (i.e., hypothesis) of the network is then compared to the desired output using a loss function. This process is known as hypothesis testing. For example, the hypothesis may be an estimated condition number (or increase or decrease in the condition number) based on one or more features of the input data. The resulting error value is calculated for each of the neurons in the output layer. The error values are then propagated from the output back through the network until each neuron has an associated error value that reflects its contribution to the original output. Backpropagation uses these error values to calculate the gradient of the loss function. Next, this gradient is fed to the optimization method, which employs the gradient to update the weights with the objective of minimizing the loss function. In some aspects, a hypothesis may be used to select an update to the input data (such as via antenna selection, for example). The network may employ a predictive algorithm to update the input data based on historical input data (which can include corresponding MIMO performance).

In the case of supervised learning, an objective can be to infer the mapping implied by observation data (e.g., signals received by an antenna array, measured channel matrix, covariances thereof, etc.). The cost function can be any function of the observation data (such as the condition number) and the neural network output. Thus, in one aspect, the cost function can relate to the mismatch between the mapping and the condition number. For example, the cost function may minimize the mean-squared error between the neural network's output and the condition number corresponding to the observation data. Minimizing this cost using gradient descent in a feedforward artificial neural network (such as a multilayer perceptron) can provide for backpropagation of errors to train neural networks. Supervised learning can be employed for sequential data to provide continuous feedback. Tasks that fall within the paradigm of unsupervised learning are typically in general estimation problems; such as clustering, the estimation of statistical distributions, compression, and filtering.

In reinforcement learning, data are usually generated by an agent's interactions with the environment. At each point in time, the agent performs an action (such as selecting a new candidate set of antennas) and the environment generates an observation and a cost according to some (usually unknown) dynamics. The aim is to discover a policy for selecting actions (e.g., antenna selection) that minimizes some measure of a policy cost (e.g., which can comprise minimizing inaccuracy in classification, finding the optimal reduction in condition number, or minimizing the condition number). The environment's dynamics and the policy cost for each policy are usually unknown but can be estimated. The environment can be modeled as a Markov decision process (MDP) with states $s_1, \ldots, s_n$ in S and actions $a_1, \ldots, a_m$ in A with the following probability distributions: the instantaneous cost distribution $P(c_t|s_t)$, the observation distribution $P(x_t|s_t)$, and the transition $P(s_{t+1}|s_t,a_t)$, while a policy is defined as the conditional distribution over actions given the observations. Taken together, the two then define a Markov chain (MC). The aim is to discover the policy (i.e., the MC) that minimizes the cost.

In some aspects, artificial intelligence techniques (such as machine learning, neural networks, and the like) can learn patterns between data matrices (or their covariances) and their corresponding condition numbers (or other MIMO performance metrics). Thus, training may comprise a first step.

Training a neural network model can comprise selecting one model from a set of allowed models (or, in a Bayesian framework, determining a distribution over the set of allowed models) that minimizes the cost. Numerous algorithms are available for training neural network models, most of which can be viewed as an application of optimization theory and statistical estimation. Some employ some form of gradient descent, using backpropagation to compute the actual gradients. This can be done by taking the derivative of the cost function with respect to the network parameters and then changing those parameters in a gradient-related direction. Backpropagation training algorithms include steepest descent (with variable learning rate and momentum, resilient backpropagation), quasi-Newton (Broyden-Fletcher-Goldfarb-Shanno, one step secant); and Levenberg-Marquardt and conjugate gradient (Fletcher-Reeves update, Polak-Ribiëre update, Powell-Beale restart, scaled conjugate gradient). Evolutionary methods, gene expression programming, simulated annealing, expectation-maximization, non-parametric methods, and particle swarm optimization are other methods for training neural networks.

The artificial intelligence techniques can then select candidate antenna sets based on the patterns it learned such that the selected antenna set(s) has a high probability of being classified as having MIMO performance above a threshold value. These patterns may also be used to disqualify candidate antenna sets. Eigenvalues of the resulting (filtered) antenna set may then be computed. As in the previous eigenvalue computations, since the eigenvalues can be isolated, they can be searched for in parallel. The number of iterations depends on the desired accuracy. MIMO performance can be computed from the eigenvalues, such as for further filtering, learning, and/or classification. Eigenvectors can be obtained following the eigenvalue computations. For example, y can be obtained from the $LDL^H$ decomposition of $W(\lambda)$ for the convergent eigenvalue $\lambda$. The eigenvector x can then be computed explicitly from the expression, $(R-\lambda I)x+Uy=0$.

In some aspects, the eigenvalues are decomposed into signal eigenvalues and noise eigenvalues. The eigenvectors can be decomposed into signal eigenvectors and noise eigenvectors. For example, the first M eigenvalues are the signal eigenvalues, which may correspond to M sources of interest. The last N-M eigenvalues are clustered together and correspond to noise. For a rank-k update, the first M+k eigenpairs (eigenvalues and eigenvectors) are modified, and the last N-M-k eigenpairs remain the same.

$$\lambda_1 \geq \lambda_2 \geq \ldots \geq \lambda_M > \lambda_{M+1} \approx \ldots \approx \lambda_N$$

where $\lambda_{M+k} \approx \ldots \approx \lambda_N \approx \sigma^2$. Thus, the update for the noise eigenvalues is $$\hat{\sigma}^2 = \frac{\hat{\lambda}_{M+1} + \hat{\lambda}_{M+2} + \ldots + \hat{\lambda}_{M+k} + (N-M-K)\sigma^2}{(N-M)}$$

If any of the $\lambda_{M+1}, \ldots, \lambda_{M+k}$ values are not close to $\sigma^2$, this observation can be used to detect additional sources.

In some aspects, in order to avoid error accumulation due to the recursive nature of the updates, pairwise Gram-Schmidt or full-scale Gram-Schmidt orthogonalization can be performed at certain update intervals, or the update procedure may be refreshed periodically.

Figure 4D:
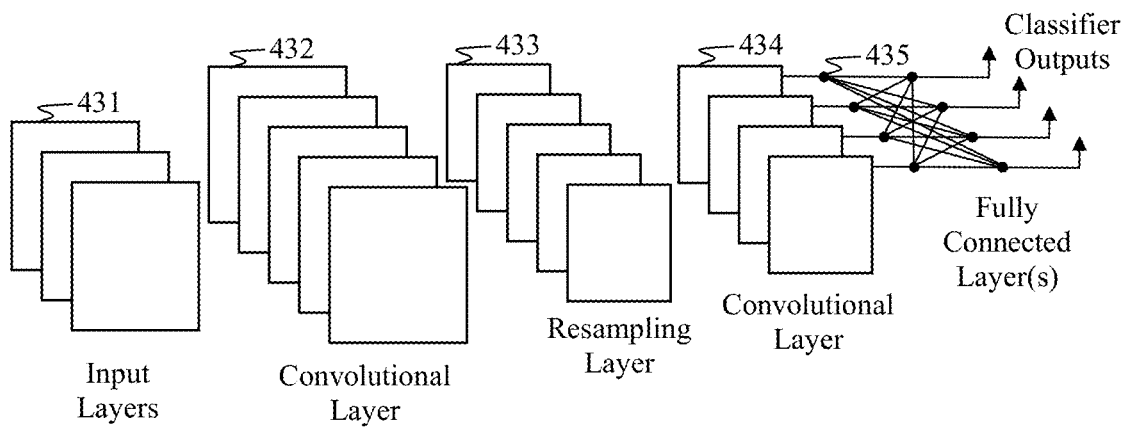
FIG. 4D illustrates a deep neural network in accordance with aspects of the disclosure that can be implemented as a convolutional neural network (CNN).

FIG. 4D illustrates a deep neural network in accordance with aspects of the disclosure that can be implemented as a convolutional neural network (CNN). Aspects disclosed herein can employ any type of deep learning network. The convolutional structure of a CNN refers to the weight-sharing principle in its convolutional layers. The output feature maps are generated, such as by using a window of 2D data (or higher-dimension tensor) from the previous layer. Each feature point in a map can be a weighted sum of the input data passed through a nonlinear activation function. The window is then moved by a given stride to produce the next feature map point using the same weights to scale the input. This operation can be a two-dimensional convolution operation, for example. Other functions disclosed herein may be employed.

The data may include measurements of from antenna receivers of known data transmissions in an unknown propagation environment (i.e., channel), unknown data transmissions in an unknown propagation channel, or unknown data transmissions in a channel in which CSI is known. The data may comprise a covariance matrix. The transmitted data may comprise precoded data, such as transform-precoded data, MIMO-precoded data, spread data, sparse code multiple access data, non-orthogonal multiple access coded data, or any of the other data formats disclosed herein. The data may comprise a channel matrix, such as may be computed from measurements of signals received by receiver antennas. In some aspects, the input data can be conditioned to have the form of an expanded matrix.

In any of the aspects disclosed herein, the expanded matrix may be generated by operating on a matrix of data symbols (such as a diagonal matrix, some other sparse matrix, or a dense matrix) with a precoding matrix, and instead of summing the products resulting from the operation, writing the products as elements (e.g., row or column elements) in the expanded matrix. The precoding may comprise MIMO precoding, transform precoding, spreading, and/or any update operation, including (but not limited to) element selection, permutation, selective mapping, symbol-constellation offset (e.g., constellation translation, constellation rotation, constellation scaling, constellation distortion, individual constellation symbol-value offsets, symbol-value dithering, and/or symbol-value transform coding), and any combination thereof.

In some aspects, the data input to the CNN comprises a 2D map that comprises channel measurements. The channel measurements can comprise any combination of channel measurements made by client-side devices, relays, and/or server-side devices. In some aspects, the 2D map comprises channel measurements made by mobile devices. Mobile devices can include autonomous-navigated vehicles and/or remote-controlled vehicles, including airborne vehicles (e.g., UASs). In some aspects, data input to the CNN comprises computations derived from channel measurements. The data inputs may comprise higher-dimension data structures, such as tensors.

In some aspects, the data input to the CNN comprises transceiver locations. For example, the data input might comprise a 2D map (e.g., 2D image) of geographical locations of client-side devices (e.g., devices that are serviceable by a wireless data network). The 2D map may include geographical locations of server-side devices, including gNodeBs, relays, remote radio heads, etc. The 2D map may comprise an overlay that denotes channel state information, which may include received signal strength. The 2D map may comprise other overlays that indicate a geographical distribution of other parameters, including (but not limited to) demand for network services, spectrum allocation, link quality metric, antenna gain, and combinations thereof. A 3D map of actual or possible UAV locations may be included.

In some aspects, the data input consists of magnitude values (in dB or natural units, for example). In some aspects, the data input comprises complex-valued data (such as I/Q samples, for example). The system may process the real and imaginary parts into two input layers of the CNN. With the added information to the input layer, the CNN is capable of learning magnitude and phase relationships in the data. Specifically, the network can be configured to learn magnitude and phase associations in the complex-valued data, which then can improve the ability of the network to adapt antenna selection and/or precoding to achieve objectives, such as reducing PAPR, improving MIMO condition number, scheduling resources (e.g., RAN infrastructure, RAN spectrum, fronthaul, backhaul, and/or computational resources) to meet current and/or predicted demand topology, or any combination thereof. CNN aspects may employ any combination of supervised and unsupervised learning to predict a future demand topology based on past (e.g., historical) data.

The disclosed system may utilize channelization of the input data into smaller chunks or input layers 431. Each of these chunks is then input to the layers 432 of the CNN, or a plurality of CNNs. In some aspects, each of a plurality of CNNs may be configured to achieve a different objective (e.g., a local objective). Data outputs from multiple CNNs may be processed to achieve a global objective that achieves an equitable combination of local objectives.

In one aspect, each CNN (i.e., a local CNN) operates to identify features in the input data that indicate a small condition number (or some other MIMO performance metric). A global objective might be to determine from the candidate MIMO configurations returned by local CNNs that provides the optimal trade-off between MIMO performance, power efficiency, and computational overhead (or some combination thereof). Classifications may comprise hard-decision and/or soft-decision classification weights made by the local CNNs.

In another aspect, each local CNN operates to identify one or more antenna selections that provides optimal (or at least favorable) link quality to a set of client devices. A global objective might be to find the best antenna selection that serves the set of client devices within some constraint, such as minimizing the number of selected antennas. In aspects wherein candidate antennas reside on mobile relays, constraints may comprise the number of available mobile relays, their locations (including altitude), their speed and direction, their planned routes, their computational resources, their power resources, their antenna resources, weather conditions, channel conditions, or combinations thereof. This selection can be based on classification weights of candidate antenna selections computed by each local CNN, and the global decision process (which may be a CNN) determines the candidate antenna selection that achieves the global objective. The global objective can comprise finding the fewest number of mobile relays to achieve the highest spectral efficiency for a given demand topology.

In some aspects, it is advantageous to employ PAPR reduction in a MIMO system. Thus, aspects disclosed herein can be adapted to find a combination of PAPR-reduction weights and MIMO processing that achieves the optimal (or at least an acceptable) combination of PAPR-reduction and spatial-multiplexing quality (which may be indicated by condition number, for example). In one aspect, a first CNN set is configured to classify a set of candidate MIMO processing configurations (e.g., antenna selections), and a second CNN set is configured to classify a set of PAPR-reduction weights for each candidate MIMO processing configuration and set of input data symbols. In some aspects, these separate CNNs may be merged. In a training mode, the CNN system can be configured to identify advantageous features in a combination of input CSI and input data symbols that correspond to combinations of MIMO processing and PAPR-reduction processing that result in a small condition number and low PAPR. In the online mode, the CNN system can detect those advantageous features in the online data and select the corresponding combination of MIMO processing and PAPR-reduction processing that produces a small condition number and low PAPR.

As depicted in FIG. 4D, a convolutional layer 432 for each map can be characterized by a filter (kernel) size F, also called the receptive field, which is related to the field of view that the kernel spans. The number of filters, K, determines how many feature maps exist. The stride, S, is the step that the kernel moves for each output computation. The amount of padding P applied to the input is used to size the output map. A 2D input array has a width W, height H, and depth (number of feature maps) D. The number of maps in a given layer determines the variability of features extracted by the neural network. Each output point in a given map can be computed via a 2D convolution, such as for an input array x[n,m] having N rows and M columns and setting the stride S=1:

$$y[n, m] = \sum_{i=1}^{N-1} \sum_{j=1}^{N-1} w[i, j] \times x[n-i, m-j]$$

It should be appreciated that in some aspects, the input array x[n,m] can comprise an expanded array format, such as indicated by matrix $\hat{x}^{(u)}$. In some aspects, input array x[n,m] can comprise channel measurements, and/or other parameters disclosed herein.

When stride S>1, the convolution is decimated, resulting in a smaller output map size. The weights w[n,m], which can be different for each feature map, are equivalent to filter kernels used in image processing. Because the weights are learned by the network, the CNN computes kernels that represent features common to all the input training data. Since the weights can be viewed as convolving with the input data, features are able to be discovered independent of their location within the input. For example, it does not matter if a feature is located in the center, bottom, or top right of a 2D image. Aspects disclosed herein may employ wavelets as the filter kernels. Wavelet scaling may be employed. In some aspects, wavelet shapes may be adapted as part of the neural network operation.

In some aspects, a feature of interest is distributed throughout the image. Thus, the rows or columns of the 2D image may be permuted (such as prior to input or during processing post input) to facilitate detection of such distributed features. In some aspects, symbol value locations in the image may be transformed or scrambled to produce an input transformed image that facilitates detection of distributed features. For example, the image may be processed using a 2D DFT or some other transform prior to input. A scrambling function may be employed. In some aspects, feature detection may be adapted to process distributed features in the input image and/or subsequent layers.

Resampling 433, described as pooling, reduces the feature map dimensions from the previous layer. As such, the deeper layers of the CNN span a larger window of the first layer. Thus, the deeper layers can extract higher-level features from the input, and resampling gives the network some scale invariance to the input data. The shallow layers tend to learn gross features, such as edges, orientation, and the like, whereas the deeper layers learn salient features of the entire input.

For classification, the CNN is followed by output layer(s) comprising multi-layer perceptron(s) (MLP). MLPs are also referred to as fully-connected layers 435, since each neuron is connected to every other neuron. MLPs are universal function approximators; these layers handle the classification task, whereas the convolutional layers (e.g., 432 and 434) handle the feature set generation. Because MLPs are fully connected, most of the free parameters (commonly referred to as weights) are located in these last layers.

In some aspects, the CNN may compute kernels that represent features common to input training data, such as to classify various features relative to MIMO performance metrics or MIMO configuration strategies. In some of the aspects disclosed herein, the CNN returns probabilities (e.g., classifier outputs) for each class, and the system may select the best MIMO configuration or strategy. In some aspects, the CNN returns at least one MIMO configuration that may be used as an initial or base configuration set in a subsequent optimization step.

Figure 5:
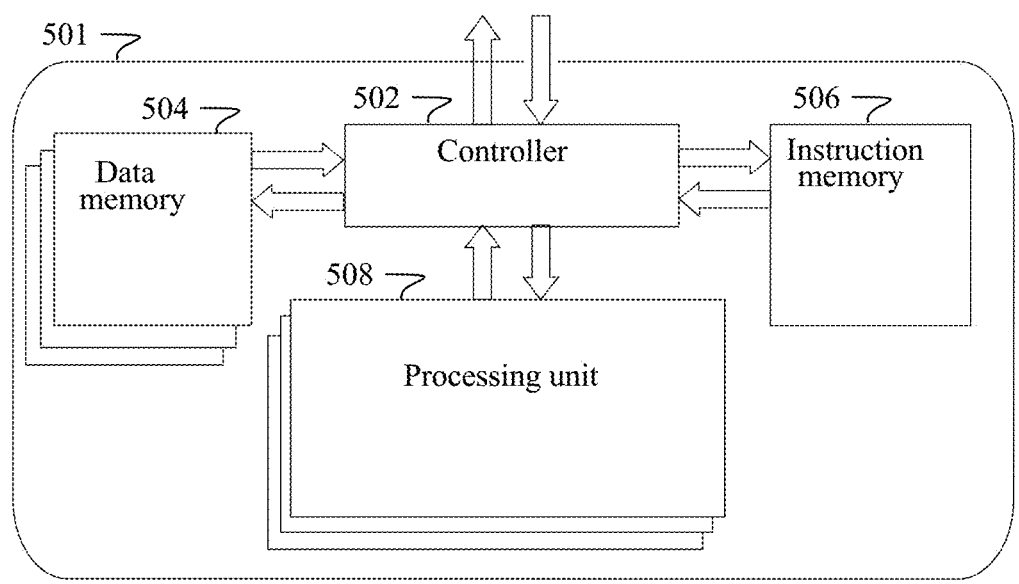
FIG. 5 illustrates a processor architecture that can be employed in accordance with aspects of the disclosure.

FIG. 5 illustrates a processor architecture 501 that can be employed in accordance with aspects of the disclosure. By way of example, but without limitation, an application specific instruction-set processor (ASIP) architecture can be employed by preparing arithmetic instructions that are specialized in complex matrix operations.

Data and instructions are stored to each memory unit (504 and 506, respectively), and at least one processing unit 508 executes instructions in order. Controller 502 manages I/O and data transfers between blocks. 504, 506, and 508. The floating-point data format supports complex values, wherein each part of a complex value comprises a 1-bit sign, a $W_e$-bits exponent, and $W_m$ bits mantissa. In the IEEE 754 standard, $W_e$=8, and $W_m$=23.

Data memories 504 and processing units 508 are arrayed to support a number of parallel processing layers. Data transfers can comprise single-data transfer (which sends single data symbols one-by-one to the processor 508) and block transfer (which sends data blocks containing multiple entries to the processor 508).

In one exemplary aspect, the processing unit 508 comprises 9 floating-point units (FPUs) and dedicated circuits for division and square root operations. Some FPUs can be allocated for multiplication, some FPUs can be allocated for addition and subtraction, and one or more FPUs may be allocated for specific operations, such as CORDIC operations for calculating trigonometric functions. Efficient processing for complex matrix operations can be provided by employing specialized instructions and an operation-unit structure. Employing dedicated circuits for division and square-root operations can enable effective hardware acceleration. Thus, division and square-root FPUs may be employed to reduce calculation time.

As used herein, a spectral decomposition of a received signal can be represented as a vector in a spectral code vector space. A signal received by multiple spatially separated antennas can be represented as a vector in a spatial code vector space. Other code vector spaces may be employed, such as a space-frequency code matrix space, a space-time code matrix space, as well as other code matrix spaces comprising two or more degrees of freedom.

Some aspects of the disclosure include characterizing a signal of interest as a combination of a spectral code space signature and a spatial code space signature. Such characterizations can be employed in a matched filter to detect a particular signal type transmitted by a device having a particular spatial code space signature, for example. This can be used to detect the presence of a particular signal or signal type transmitted from a particular geographical (and/or spatial) location. Such characterizations can also be employed in a Wiener filter (or some other filter type) to separate a signal of interest from other received signals based on some predetermined spectral code space signature and spatial code space signature. Such aspects can be directed toward detecting and possibly identifying radio transmissions from particular devices based on signal type and geospatial location (e.g., any combination of geographical location and altitude).

In the following discussion, a code vector of length N lies in an N-dimensional space. A received signal can be represented as a vector having a magnitude and direction. Typically, a received signal comprises at least one signal of interest, possibly other signals, and noise. If a signal of interest and another signal are not orthogonal, their corresponding code vectors have non-zero cross-correlation.

In one aspect, the received signal vector comprises a vector sum of a signal-of-interest vector and at least one interfering signal vector plus noise. The received signal vector may be projected in a direction that is orthogonal to the at least one interfering signal, thereby reducing (perhaps eliminating) the contribution of the interference to the signal of interest. The resulting projection can recover a substantial amount of the signal of interest while reducing the contribution of the interfering signal, resulting in an improvement of the SNR. The received signal can comprise multiple interfering signals. Thus, it is contemplated that the techniques disclosed herein can be adapted to remove such interference.

In some aspects, a processor is configured to compute a cancellation operator that removes interfering signals from a received signal, such as via the Gram-Schmidt process. In the following discussion, S represents a matrix of signals selected for removal. This cancellation operator can be described as a directional filter in the corresponding code space. For example, the cancellation operator can be a projection operator expressed by:

$$P_S^\perp = I - S(S^T S)^{-1} S^T$$

wherein $P_S^\perp$ is an orthogonal projection operator, I is an identity matrix, and S is the matrix of signals selected for removal. In some aspects, a matrix computation can be configured for computing an equivalent value $(S^T S)^{-1}$ without performing a full matrix inversion. For example, orthogonalizing the set of vectors comprising the S matrix can simplify the $(S^T S)^{-1}$ term.

In the following discussion, the matrix S comprises column vectors s: $S=[s_1, s_2, \ldots, s_n]$, wherein n is an integer equal to the number of vectors in matrix S. To orthogonalize the vectors in S, vector $u_1$ is designated as equivalent to $s_1$, and the vector $s_2$ is projected onto a subspace that is orthogonal to $u_1$ to produce vector $u_2$. Next, the vector $s_3$ is projected onto a subspace that is orthogonal to the subspace spanned by $u_1$ and $u_2$ to produce $u_3$. This process is performed for all the vectors of matrix S to produce $u_1, \ldots, u_n$, which provides an orthogonal basis. In some aspects, an orthonormal basis may be constructed. A vector $u_n$ is expressed as:

$$u_n = s_n - \sum_{j=1}^{n-1} P_{u_j}^+ s_n = s_n \sum_{j=1}^{n-1} u_j (u_j^T u_j)^{-1} u_j^T s_n$$

It is useful to note that once a term $(u_j^T u_j)^{-1}$ is calculated, the result can be used in subsequent iterations without repeating its calculation. Furthermore, this simplification can be exploited in the case when one or more column vectors s in matrix S are updated in order to simplify a subsequent update to a matrix U.

The matrix S is represented by matrix U: $U=[u_1, u_2, \ldots, u_n]$, and the projection operator constructed from matrix U is now $$P_U^\perp = I - U(U^T U)^{-1} U^T$$

Since the vectors u are orthogonal and thus have zero cross correlation, the term $U^T U$ is a diagonal matrix comprising scalar diagonal terms $u_j^T u_j$. This avoids the full matrix inverse, $(S^T S)^{-1}$, thus, the calculation of the projection operator is simplified.

In some aspects, matrix S may be singular, or ill-conditioned, when two or more vectors s are substantially correlated. This can result in a term $(u_j^T u_j)^{-1}$ in the $(U^T U)^{-1}$ calculation that is very large. Thus, the terms $u_j^T u_j$ may be compared to a threshold, and if a term is below the threshold, the corresponding vector s may be removed and the corresponding orthogonality calculations may be discarded and/or avoided.

In one aspect, when at least one term $u_j^T u_j$ is below the threshold, a new or updated S matrix may be provisioned to provide uncorrelated vectors $s_j$ in the S space. In some aspects, correlated vectors $s_j$ may be combined. For example, upon determining that the amount of correlation between a pair of s vectors exceeds a predetermined threshold, the pair of s vectors can be combined followed by any of the orthogonalization techniques disclosed herein. In some aspects, correlated s vectors are combined upon determining that the corresponding signal subspaces do not need to be separated. In other aspects, correlated s vectors are combined for the purpose of S-matrix processing herein and some alternative interference-excision technique is provisioned to separate the correlated s vectors.

In some aspects, an updated S matrix is provisioned (such as to provide uncorrelated vectors $s_j$) by adapting the receiver in order to change its response to transmitted signals. In one aspect, a change to each receiver parameter affects one row in the S matrix. The disclosed techniques, such as the advantageous use of sparse matrices and reusing calculations, as well as other disclosed techniques, can simplify updates to the S matrix. In some aspects, an updated S matrix is provisioned when the receiver directs one or more of the transmitters to adapt one or more transmit parameters. In one aspect, a change to each transmitter parameter changes one column in the S matrix. As disclosed herein, techniques, such as the advantageous use of sparse matrices, an advantageous ordering of s vectors, reusing calculations, as well as other techniques, can simplify improvements to the S matrix.

Figure 6A:
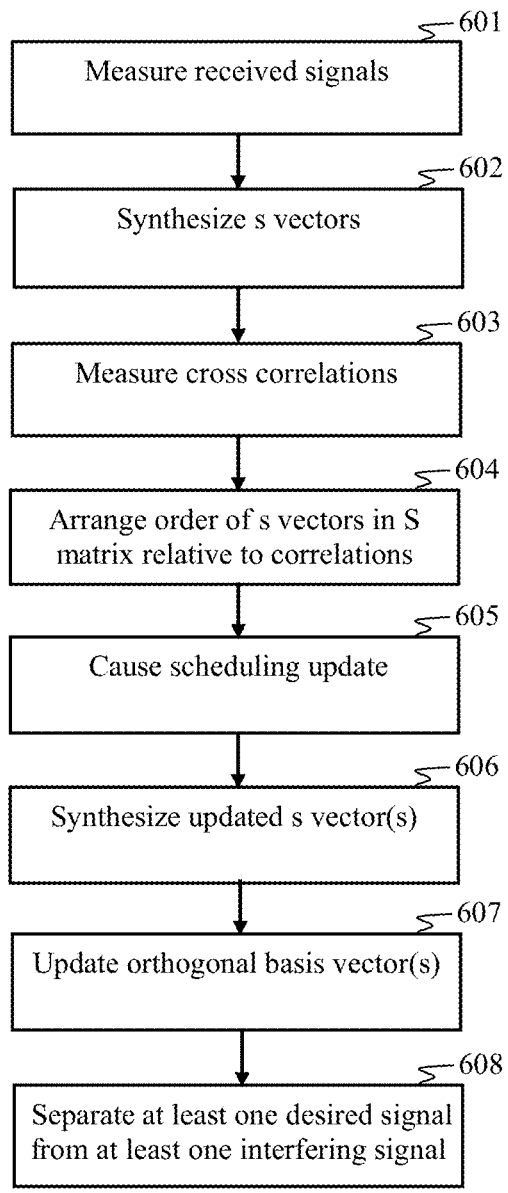
FIGS. 6A and 6B are flow diagrams that illustrate methods according to some aspects of the disclosure.

FIG. 6A is a flow diagram that illustrates a method according to some aspects of the disclosure. A plurality of received transmissions are measured 601, and a plurality of column vectors (s vectors) of a signal matrix S are synthesized 602 therefrom. Cross correlations between the column vectors are measured 603, and the processing order of the column vectors is arranged 604 relative to the measured cross correlations in order to reduce subsequent processing if the transmitted signals are updated. Upon determining an unsatisfactory amount of cross correlation between at least two column vectors, the transmitter is caused to update 605 scheduling of at least one of the transmitted signals, thereby changing at least one of the column vectors. For example, the transmitter can be instructed to schedule a transmission stream to a different layer (e.g., antenna, beam pattern, subspace, etc.). The transmitter can be instructed to schedule a transmission stream to a different resource block (e.g., different subcarrier(s)). Such aspects can be employed in a non-orthogonal multiple access (NOMA) scheme wherein multiple transmitters employ overlapping resource elements. The receiver may transmit control information (e.g., a feedback signal) to instruct the transmitter in such a manner. The affected column vector(s) is (are) updated 606 or an update to the column vector(s) is (are) synthesized, and the update(s) and/or updated column vector(s) are used to update a previous calculation of orthogonal basis vectors corresponding to the S matrix 607. At least one received signal of interest can be separated from at least one interfering signal 608.

Aspects disclosed herein can be directed toward MIMO and NOMA applications in communications. In some aspects, upon a receiver determining that the amount of correlation between a pair of s vectors exceeds a predetermined threshold, the receiver sends a control message (e.g., a feedback control message) to one or more corresponding transmitters to effect a change in one or more transmission properties that results in a change to an S matrix at the receiver. Upon receiving the control message, the transmitter(s) changes at least one transmitter parameter to effect a change in at least one physical property of at least one of the transmitted signals that maps to at least one of the pair of correlated s vectors. For example, the transmitter might change the spatial transmission characteristics of the signal, such as by selecting a different transmit antenna(s), changing corresponding precoding weights, or otherwise effecting a change to the transmit spatial characteristics of the signal. This can effect a change to the corresponding ($j^{th}$) column vector $s_j$ in the S matrix. Such column updates to the S matrix can be processed in the receiver using techniques, such as employing sparse update vectors, reusing calculations from previous processing, and exploiting any of the efficient matrix operations disclosed herein. For example, if a single column in the S matrix is updated, the disclosed techniques can be implemented instead of repeating calculations that employ the full S matrix.

In some aspects, the transmitter(s) can change scheduling of one of the correlated signals in order to decorrelate the signals at the receiver. For example, scheduling a data channel to a different resource block can remove the corresponding column vector $s_j$ from the S matrix. Scheduling a data channel to a different transmitter antenna or a different transmit beam pattern can change the corresponding column vector $s_j$.

Prior to the first update, the initial set of vectors s in the S matrix is orthogonalized during a first iteration as follows:

$u_1 = s_1$ $u_2 = s_2 - u_1(u_1^T u_1)^{-1} u_1^T s_2$ $u_3 = s_3 - u_1(u_1^T u_1)^{-1} u_1^T s_3 - u_2(u_2^T u_2)^{-1} u_2^T s_3$ $\vdots$ $u_N = s_N - u_1(u_1^T u_1)^{-1} u_1^T s_N - \ldots - u_{N-1}(u_{N-1}^T u_{N-1})^{-1} u_{N-1}^T s_N$ It can be seen that the projection operator calculated for an $n^{th}$ orthogonal basis vector $u_n$ can be reused for subsequent $p^{th}$ orthogonal basis vectors $u_p$ (where p=n+1, ..., N, for example). For example, the operator $u_1(u_1^T u_1)^{-1} u_1^T$ calculated for $u_2$ can be reused for $u_3, \ldots, u_N$.

If $s_1$ is changed, this causes $u_1$ to change. Consequently, the operator $u_1(u_1^T u_1)^{-1} u_1^T$ and all subsequent basis vectors $u_n$ and operators $u_n(u_n^T u_n)^{-1} u_n^T$ (n=2, ..., N-1) would change. However, if $s_N$ is changed, then only $u_N$ is changed, and no operators need to be updated. Thus, aspects of the disclosure provide for arranging the computation order of s vectors based on a confidence measure indicative of the likelihood that each s vector needs to be updated. The confidence measure can be a function of the correlation measured between the s vectors, for example. Such correlation measurements (and their updates) can be based on eigenvalue computations, such as the algorithms described herein. Low-precision numerical approximations may be performed for at least some of the eigenvalues, as only the order of the s vectors needs to be determined. Furthermore, the order of at least some of the vectors (such as those vectors that are least correlated) does not need to be precisely determined, which can further relax the computational complexity of the eigenvalue approximations.

In one aspect, in the first iteration prior to an update, at least some basis vectors $u_1, u_2, \ldots, u_n$ can be stored in memory for use in subsequent iterations. For example, during a first iteration, at least the basis vectors $u_1, u_2, \ldots, u_{N-1}$ and the operators $u_n(u_n^T u_n)^{-1} u_n^T$ (n=1, ..., N-1) are stored in memory for use in one or more subsequent iterations, such as when the received signal vector $s_N$ is caused to change, such as by a change in transmitter configuration and/or scheduling. Correlations between the s vectors are measured, and confidence measures based on the measured correlations are assigned to each s vector. The order in which the s vectors are processed is determined via the confidence measures, wherein each confidence measure can indicate a likelihood that its corresponding s vector will be updated in a subsequent iteration. In one aspect, the s vectors that are least correlated with each other may be processed first, and those that are most correlated are processed last. In some aspects, each column vector s is arranged in matrix S from first (1) to last (N) in ascending likelihood that it will need to be updated. In some aspects, each column vector s is arranged in matrix S from first (1) to last (N) in ascending measures of cross correlation with other s vectors. For example, the s vector that is most correlated with at least one other of the s vectors in S can be designated as the last ($N^{th}$) column vector inserted in S.

In one aspect, upon determining that an updated s vector is required, the receiver notifies the transmitter(s), which responds to the notification by changing at least one transmitted signal parameter to effect a change in the corresponding s vector. The notification can include instructions to update the at least one transmitted signal parameter, such as changing antenna selection, precoding, beamforming weights, and/or other transmitter parameters. In another aspect, the transmitter collects channel state information (CSI), such as by measuring reciprocal channel conditions or receiving CSI feedback from the receiver. The transmitter then calculates cross correlations of the s vectors, and if the cross correlation exceeds a threshold, it may update one or more transmitter parameters to reduce the cross correlation.

Upon receiving an updated s vector, the receiver exploits the advantageous processing order developed in the first iteration to update the set of orthogonal basis vectors u. The receiver can use stored values of the orthogonal basis vectors and at least one of the previously calculated operators to efficiently update the set of basis vectors. If vector $s_N$ is changed, for example, then the operators $u_n(u_n^T u_n)^{-1} u_n^T$ (n=1, . . . , N−1) are employed to update the basis vector $u_N$. In some aspects, updates to the basis vectors and operators can be stored for use in subsequent iterations, such as to avoid the need for repeating calculations. In one aspect, an update to the basis vectors necessitated by a change in the S matrix is processed as a change to the S matrix calculated in the first iteration and employs only stored values from the first iteration. In another aspect, the update is processed as a change to the S matrix calculated in a subsequent iteration and employs stored values from the subsequent iterations It should be appreciated that in cases in which non-square MIMO matrices are employed (e.g., the number of receiver antennas is greater than the number of transmitter antennas, or vice versa), the techniques disclosed herein can be employed when columns are effectively added and/or removed from the S matrix.

Figure 6B:
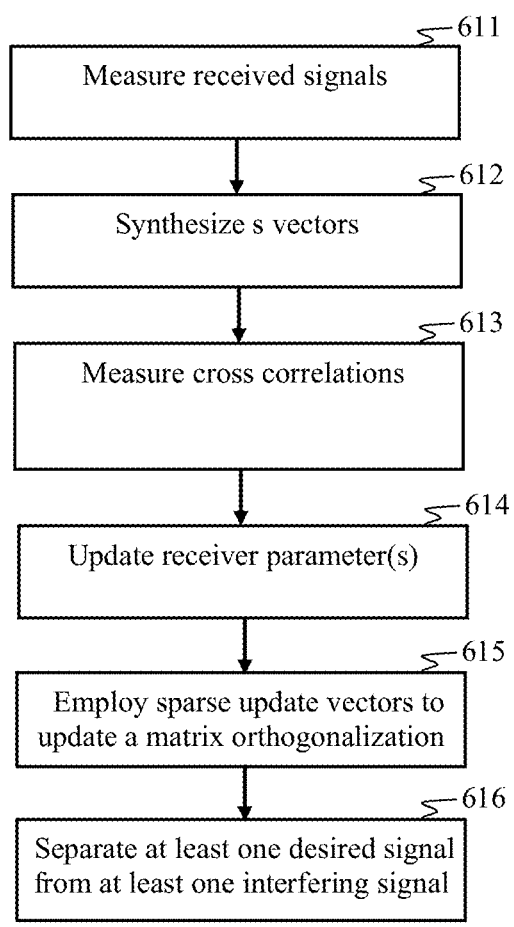

FIG. 6B is a flow diagram that illustrates a method according to some aspects of the disclosure. A plurality of received transmissions are measured 611, and a plurality of column vectors (s vectors) of a signal matrix S are synthesized 612 therefrom. Cross correlations between the column vectors are measured 613, and upon determining an unsatisfactory amount of cross correlation between at least two column vectors, the receiver updates 614 at least one of its receiver parameters, thereby changing at least one of the row vectors in the S matrix. Sparse update vectors are generated to update a previously calculated matrix orthogonalization 615. At least one received signal of interest can be separated from at least one interfering signal 616.

In some aspects, one or more receiver parameters may be changed to provide decorrelated vectors $s_j$. For example, in the case of a spectral code space, a frequency bin of an FFT may be changed to effect provisioning of a new row in the S matrix, which effectively provides a sparse update vector to each column vector $s_j$. In the case of a spatial code space, a spatial parameter (such as a selected receiver antenna) may be changed to effect an update to a row in S. In the case of a space-frequency code space, a corresponding space-frequency parameter may be changed (such as by changing either or both the corresponding frequency bin and antenna). Similarly, other physical parameters of a receiver system can be changed to decorrelate the vectors s in matrix S, such parameters not being limited to those mentioned herein.

When the projection operator $P_i t$ is applied to the received signal vector y, it projects the received signal y onto a subspace that is orthogonal to the subspace spanned by the u vectors to produce an interference-cancelled signal.

In accordance with some aspects of the disclosure, a method is presented for changing the projection operator $P_i t$ in response to updating the code space S. Prior to the first update, the initial set of vectors s in the S matrix is orthogonalized during a first iteration as follows:

$u_1 = s_1$ $u_2 = s_2 - u_1(u_1^T u_1)^{-1} u_1^T s_2$ $u_3 = s_3 - u_1(u_1^T u_1)^{-1} u_1^T s_3 - u_2(u_2^T u_2)^{-1} u_2^T s_3$ $\vdots$ $u_N = s_N - u_1(u_1^T u_1)^{-1} u_1^T s_N - \ldots - u_{N-1}(u_{N-1}^T u_{N-1})^{-1} u_{N-1}^T s_N$ It can be seen that the projection operator calculated for an $n^{th}$ orthogonal basis vector $u_n$ can be reused for subsequent $p^{th}$ orthogonal basis vectors $U_p$ (where p=n+1, . . . , N, for example). For example, the operator $u_1(u_1^T u_1)^{-1} u_1^T$ calculated for $u_2$ can be reused for $u_3$, . . . , $u_N$. In some aspects, in the first iteration prior to an update, at least some basis vector $u_1, u_2, \ldots, u_n$ computations can be stored in memory for use in subsequent iterations. These stored computations can include $u_m^T s_n$ and $u_m u_m^T s_n$ for m=1, . . . , N−1, and n=2, . . . , N, for example. Other computations may be stored for use in subsequent iterations.

In accordance with one aspect of the disclosure, a second iteration begins by causing a row in S to change. This can be effected by updating one or more receiver parameters. The change in S can be modeled as an addition of a sparse update vector $\Delta s_j$ to each vector $s_j$ in S. An updated $j^{th}$ vector is expressed as:

$s_j^{(u)} = s_j + \Delta s_j$ wherein vector $\Delta s_j$ is a sparse vector (i.e., mostly zero values) that updates the previous vector $s_j$, and is the difference between the updated vector $S_j^{(u)}$ and the previous vector $s_j$.

Each vector $s_j$ in S comprises elements from a $j^{th}$ interference signal. Each value in $s_j$ denotes a sample of the interference signal, such as a spectral sample (e.g., a frequency bin of a DFT), a spatial sample (e.g., a signal measurement from a particular antenna or spatial direction), a space-frequency sample (e.g., a spectral sample from a particular antenna or spatial direction), a space-time sample (e.g., a signal measurement at a particular time from a particular antenna or spatial direction), and/or any subspace sample. In accordance with aspects disclosed herein, updates to the S matrix can comprise a combination of sparse row updates effected by changing a selection of at least one receiver parameter and sparse column updates (e.g., causing changes to one or a few of the columns) effected by changing a selection of at least one transmitter parameter. Adaptations to both rows and columns may be made simultaneously or iteratively.

It should be appreciated that samples in vector $s_j$ may be correlated and/or uncorrelated with each other. Also, there can be different degrees of correlation between signal vectors s. Such correlations depend on signal waveform characteristics and channel conditions in which the waveforms propagate. In aspects disclosed herein, the received vectors s can be adapted based on the physical characteristics of the receiver apparatus in order to decorrelate the vectors and/or samples. By way of example, and without limitation, changes can be made to the geographical location of at least one antenna, antenna orientation, antenna polarization, antenna beam pattern, DFT parameters, sample interval, and the like. Physical characteristics of the receiver apparatus can be provisioned to effect decorrelation between the vectors s, and/or between samples of each vector $s_j$. This can comprise selecting antennas, selecting DFT frequency bins, and/or other receiver parameters to improve decorrelation between the vectors s and/or vector samples.

A selection of antennas, DFT frequency bins, and/or other receiver parameters can comprise changing a small number of receiver parameters to effect a change in the signal vectors s, which may be followed by determining if the new (i.e., updated) signal vectors are better decorrelated. In some aspects, relative movement between receiver antenna(s) and transmitter antenna(s) (which can include relays therebetween, such as mobile relays) can be adapted to improve decorrelation (which can be particularly advantageous in mmWave communications). The relative movement can be adapted via navigation (e.g., heading, speed, altitude) of one or more platforms on which transmitter and/or receiver antennas reside. Orientation (e.g., pitch, yaw, roll) of the platform may be adapted. Such adaptations can effect differences in frequency (e.g., due to Doppler), received power (e.g., due to relative distances between transmitter and receiver antennas), angle of arrival, time of arrival, phase offsets, and deltas of the aforementioned signal properties. Such differences can be provided to improve decorrelation of different signal streams that have overlapping resource elements. It should be appreciated that decorrelation as used herein can also refer to decorrelation enabled by NOMA processing (such as message passing algorithms and others). Thus, while some vectors $s_j$ may be highly correlated in the S space, this correlation may be disregarded in the disclosed techniques if the corresponding signals can be decorrelated via NOMA processing.

In some aspects, one or more receiver parameters may be adapted in response to whether decorrelation was improved, a related threshold value indicating correlation or decorrelation, a number of iterations, and/or possibly in response to the amount of change in correlation (e.g., via gradient techniques).

By way of example, and without limitation, a selected one of N receiver antennas can be replaced by a new antenna. In another example, one of N DFT frequency bins is changed to a different DFT frequency bin. In each case, this changes one of N elements (i.e., samples) in each column vector s. In aspects disclosed herein, instead of recalculating the entire projection operator $P_U^\perp$, matrix properties, such as the matrix product being distributive over matrix addition and the reduced complexity of multiplying sparse matrices, can be exploited in combination with reusing previous calculations to update the projection operator $P_U^\perp$ using fewer complex multiplications.

The second iteration comprises the first update. In the case of j=1, the first updated (u1) orthogonal basis vector $u_1^{(u1)}$ is set equal to the first updated interference vector $s_1^{(u1)}$:

$$u_1^{(u1)} = s_1^{(u1)} = s_1 + \Delta s_1^{(u1)}$$

wherein $s_1$ is the first signal vector prior to the update, and vector $\Delta s_1$ is a sparse vector having a single non-zero term:

$$s_1 = \begin{vmatrix} s_{1,1} \\ s_{1,2} \\ \vdots \\ s_{1,N} \end{vmatrix} \text{ and } \Delta s_1 = \begin{vmatrix} 0 \\ 0 \\ \vdots \\ \Delta s_{1,N}^{(u1)} \end{vmatrix}$$

where $\Delta s_{1,N}^{(u1)}$ is a complex-valued scalar. The vector $\Delta u_1^{(u1)}$ is also a sparse vector, and is equal to $\Delta s_1^{(u1)}$:

$$u_1^{(u1)} = u_1 + \Delta u_1^{(u1)}$$

For j=2, the updated orthogonal basis vector $u_2^{(u1)}$ is calculated as follows:

$$u_2^{(u1)} = (I - u_1^{(u1)}(u_1^{(u1)T}u_1^{(u1)})^{-1}u_1^{(u1)T})s_2^{(u1)}$$

wherein $$s_2^{(u1)} = s_2 + \Delta s_2^{(u1)}$$

$$s_2 = \begin{vmatrix} s_{2,1} \\ s_{2,2} \\ \vdots \\ s_{2,N} \end{vmatrix} \text{ and } \Delta s_2 = \begin{vmatrix} 0 \\ 0 \\ \vdots \\ \Delta s_{2,N}^{(u1)} \end{vmatrix}$$

The term, $(u_1^{(u1)T}u_1^{(u1)})$, is a scalar value equal to $$u_{1,1}^2 + u_{1,2}^2 + \ldots + (u_{1,N}^2 + 2u_{1,N}\Delta u_{1,N}^{(u1)} + (\Delta u_{1,N}^{(u1)})^2)$$

which allows it to be updated by adding $2u_{1,N}\Delta u_{1,N}^{(u1)} + (\Delta u_{1,N}^{(u1)})^2$ to the previous calculation, $(u_1^T u_1)$.

The updated orthogonal basis vector $u_2^{(u1)}$ is $$u_2^{(u1)} = (I - (u_1^{(u1)T}u_1^{(u1)})^{-1}(u_1 + \Delta u_1^{(u1)})(u_1 + \Delta u_1^{(u1)})^T)s_2$$

which can be rewritten as $$u_2^{(u1)} = \left(I - \left(u_1^{(u1)T}u_1^{(u1)}\right)^{-1}(u_1 + \Delta u_1^{(u1)})\left(u_1^T + \Delta u_1^{(u1)T}\right)\right)s_2^{(u1)} =$$

$$\left(I - \left(u_1^{(u1)T}u_1^{(u1)}\right)^{-1}\left(u_1 u_1^T + \Delta u_1^{(u1)}u_1^T + u_1\Delta u_1^{(u1)T} + \Delta u_1^{(u1)}\Delta u_1^{(u1)T}\right)\right)s_2^{(u1)}$$

wherein the term $u_1 u_1^T$ was constructed previously (i.e., prior to the current update) and can be reused here. The result from the calculation of $u_1 u_1^T s_2$ in the first iteration can be reused here. Similarly, the term $u_1^T s_2$, which appears twice here, was calculated in the first iteration and can be reused here. Since $\Delta u_1^{(u1)T}$ is sparse, the products $\Delta u_1^{(u1)T} s_2^{(u1)}$ require few multiplications.

By virtue of providing for sparse vectors $\Delta u_1^{(u1)}$ and $\Delta s_2^{(u1)}$, calculations in the above equation are simplified, and it should be appreciated that the number of computations can be substantially reduced. For example, the operator $\Delta u_1^{(u1)} u_1^T$ has a single row of N non-zero values, $u_1 \Delta u_1^{(u1)T}$ has a single column of N non-zero values, and $\Delta u_1 \Delta u_1^{(u1)T}$ has a single non-zero value (e.g., at matrix index n,n).

The updated orthogonal basis vector $u_2^{(u1)}$ comprises a linear combination of original vectors $u_1$ and $s_2$ plus the addition of a sparse vector $\Delta u_2^{(u1)}$ having a single non-zero element ($\Delta u_{2,N}^{(u1)}$ in the case shown herein).

$$u_2^{(u)} = \alpha_2 s_2 + \beta_2 u_1 + \Delta u_2^{(u1)}$$

The calculation of coefficients $\alpha_2$ and $\beta_2$ of this linear combination and the calculation of the additive sparse vector's non-zero element $\Delta u_2^{(u1)}$ are simplified due to $\Delta u_1^{(u1)}$ and $\Delta s_2^{(u1)}$ being sparse. Techniques for calculating updated orthogonal basis functions (such as a $u_2^{(u1)}$) disclosed herein are enabled with less computational complexity compared to the entire projection operation (e.g., $P_{u_1}^\perp$) for the updated orthogonal basis $u_1^{(u1)}$. This provides a dramatic reduction in computational overhead when N is large. Such operations that exploit the distributive property of matrix multiplication across addition in combination with sparse update vectors can be used to update subsequent orthogonal basis vectors and projection operations instead of repeating the full projection for a new S matrix. Techniques disclosed herein can enable incremental and iterative updates to the S matrix, such as to quickly identify a set of receiver parameters (e.g., a set of selected receiver antennas, a set of DFT properties, subspace selection, etc.) that provide a set of orthogonal basis vectors having a predetermined degree of decorrelation.

The updated orthogonal basis vector $u_3^{(u1)}$ is:

$$u_3^{(u1)} = s_3^{(u1)} - u_1^{(u1)}(u_1^{(u1)T}u_1^{(u1)})^{-1}u_1^{(u1)T}s_3^{(u1)} - u_2^{(u1)}(u_2^{(u1)T}u_2^{(u1)})^{-1}u_2^{(u1)T}s_3^{(u1)}$$

The operator $u_1^{(u1)}(u_1^{(u1)T}u_1^{(u1)})^{-1}u_1^{(u1)T}$ was calculated for $u_2^{(u1)}$, and can be reused here.

In some aspects, it can be useful to express $u_2^{(u1)}$ as a linear combination of the original orthogonal basis vectors $u_1$ and $u_2$ (plus a sparse vector $\Delta u_2^{(u1)}$). For example, an expression for vector $s_2$ can be derived from a corresponding calculation of the basis vector $u_2$ made in the first iteration:

$$u_2 = (I - u_1(u_1^T u_1)^{-1} u_1^T) s_2$$

such that $$s_2 = u_2 + (u_1^T u_1)^{-1} \left( \sum_{i=1}^{N} u_{1,i} s_{2,i} \right) u_1$$

where the scalar terms $(u_1^T u_1)^{-1}$ and $$\sum_{i=1}^{N} u_{1,i} s_{2,i}$$

can be obtained from calculations made in the first iteration.

Thus, the updated vector $u_2^{(u1)}$ can be expressed as a linear combination of $u_1$, $u_2$, and $\Delta u_2^{(u1)}$:

$$u_2^{(u1)} = a_2 u_2 + b_2 u_1 + \Delta u_2^{(u1)}$$

where $a_2$ and $b_2$ are scalar coefficients whose calculations are aided by calculations of component terms therein made in the first iteration and calculations involving sparse vectors.

Thus, in the third term of the above expression for basis vector $u_3^{(u1)}$, the operation $u_2^{(u1)}u_2^{(u1)}s_3^{(u1)}$ comprises the operations $u_1^T s_3$ and $u_2^T s_3$ that were made in the first iteration and can be reused here without repeating the calculations. Furthermore, the third term comprises the operation, $\Delta u_2^T s_3$, which is simplified by the sparse vector $\Delta u_2^T$. Sparse vectors also simplify the calculations of the corresponding scaling factors. This process can be extended to subsequent basis vectors $u_n^{(u1)}$ as necessary.

In a third iteration, a second update (u2) is made to the s vectors, and this iteration is performed similarly with respect to the second iteration, but with a new sparse update vector $\Delta s_j^{(u2)}$ corresponding to each original vector $s_j$:

$$s_j^{(u2)} = s_j + \Delta s_j^{(u2)}$$

Additional iterations may be performed in the same manner.

In accordance with aspects of the disclosure, the above reduced-complexity calculations can be part of an adaptive interference-cancellation scheme wherein receiver parameters are updated, followed by measurement of a performance metric that indicates an overall signal quality. Based on the measurement (such as whether it meets a predetermined threshold), receiver parameters might be further updated. The number of updates might be limited to a predetermined maximum. A determination of which receiver parameter to update and/or how much to update a receiver parameter might be made based on analysis of how previous parameter updates affected the performance metric(s). An update may be selected based on an estimated likelihood that it will cause the performance metric to improve.

By way of example, the receiver parameters can be updated to effect a sparse-matrix update. Such updates might change a small number of rows (e.g., fewer than half the rows-possibly only one or two rows) in the S matrix. Receiver parameter updates can include via updates to which receiver antennas are selected in a multi-antenna receiver, updates to which spectral components are selected (from a DFT, for example), updates to which space-frequency components are selected, and/or other receiver parameter updates that affect cross correlation between the subchannels processed in the receiver.

By way of example, the performance metric can comprise a measurement of correlations between subchannels. The performance metric can comprise a measurement of the amount of correlation (or absence of correlation) between the vectors s. The matrix S may be measured to determine how well-conditioned it is. The performance metric can comprise a function of eigenvalues of the S matrix or some matrix derived from the S matrix. In some aspects, the condition number of the S matrix may be determined. In some aspects, the performance metric comprises a measure of BER, SNR, QoS, throughput, or some other signal quality measurement on each subchannel. The performance metric might comprise a function of signal quality measurements, such as (but not limited to) an average, mean, minimum, and/or maximum quality measurement.

In some aspects, the received signal vector can be projected in a direction that improves detection of an interference signal such that an estimated interference signal can be synthesized and then subtracted from the received signal. This approach might be performed iteratively. For example, the strongest interference signal might be detected first and synthesized to produce an estimated interference signal that is subtracted from the received signal. The resulting interference-cancelled signal may be processed in the same manner as above to effectively remove the next strongest interference signal. This process can be repeated until a predetermined criterion is met, such as a threshold SNR, a predetermined number of iterations, and/or some other criteria.

Figure 7:
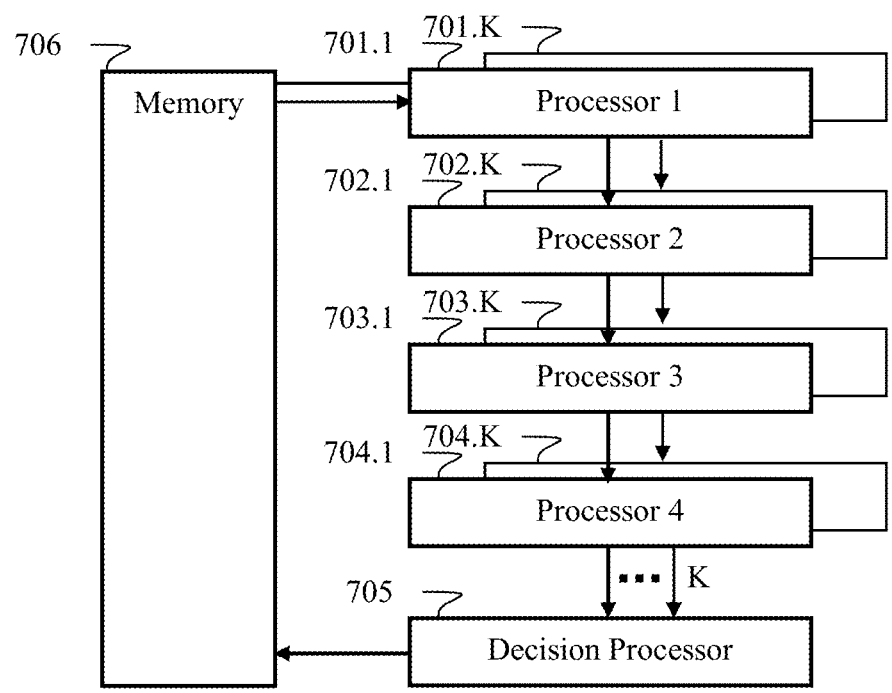
FIG. 7 illustrates a parallel pipelined processing architecture that can be employed in aspects disclosed herein.

Methods disclosed herein, such as MIMO and code-space processing, can be implemented with parallel and/or pipelined processing architectures. FIG. 7 illustrates a parallel pipelined processing architecture that can be employed in aspects disclosed herein. In the following disclosure, K represents a plurality of processing layers. FIG. 7 comprises four processors by way of example (e.g. processors 701.1-704.1 for layer 1, to processors 701.K-704.K for layer K). A processor (such as decision processor 705) might be provided to aggregate, combine, or otherwise process data from the K layers. Data read into memory 706 may be used by processors 701.1-701.K. Thus, the present architecture can provide for feedback and iterative processing capabilities.

Figure 8:
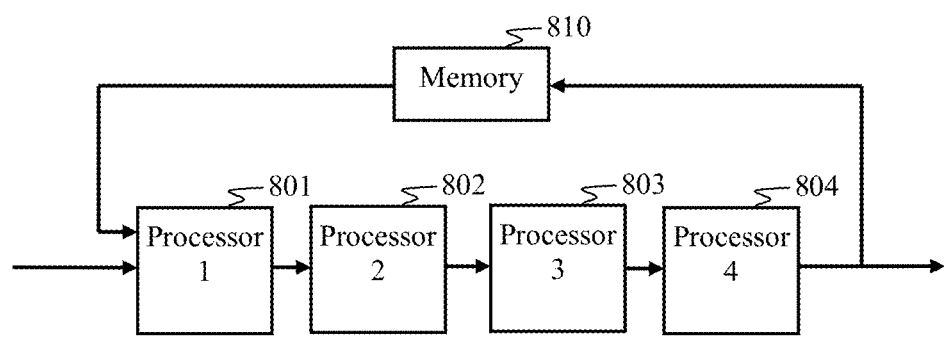
FIG. 8 illustrates a pipelined processor architecture configured to perform MIMO and/or code-space processing according to aspects disclosed herein.

FIG. 8 illustrates a pipelined processor configured to perform MIMO and/or code-space processing according to aspects disclosed herein. In the aspect disclosed in FIG. 8, a single pipeline can generate MIMO processing decisions for four groups of data. This pipeline is shared between the four groups in order to perform the calculation. By way of example, but without limitation, in this aspect, the pipeline is partitioned into four processor functions segregated by clocked flip-flops that form the pipeline. When group 1 is being processed by the first processor function 801, a clock cycle passes before the results are latched. At that point, the first processor function 801 becomes free to operate on group 2. Meanwhile the result in the first flip-flop of group 1 is applied to the second 802 of four processor functions to perform the next calculation. Then a clock cycle later, the results are latched in a second set of flip-flops. Simultaneously, group 2 is being processed by the first 801 of four processor functions. A clock cycle passes before both of these results are latched. Then, the third group is processed by the first processor function 801, a clock cycle passes before the results are latched. Simultaneously, group 1 is in the third processor function 803, and group 2 is in the second processor function 802. Then, simultaneously, group 1 is in the fourth processor function 804, group 2 is in the third processor function 803, group 3 is in the second processor function 802, and the last (fourth) group is processed by the first processor function 801. Data coupled into memory 810 can be used to process subsequent groups, the iterations to be performed in the same manner as described above.

Figure 9A:
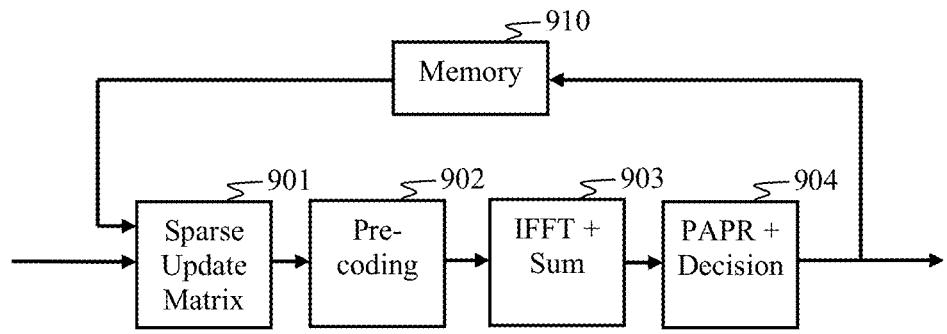
FIGS. 9A-9E are each block diagrams of pipelined processor architectures configured to perform processing operations disclosed herein.
Figure 9B:
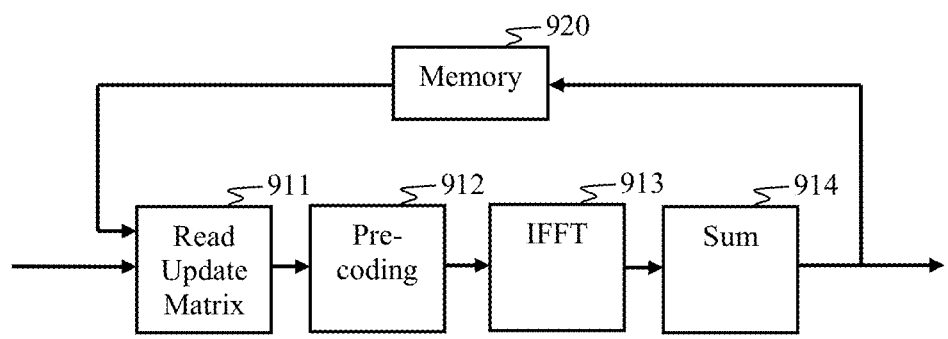

In one aspect, a sparse update data matrix is calculated, followed by a precoding operating on the update matrix. An IFFT is performed on the precoded update, and the output of the IFFT is added to a base transmit signal, which may be determined during a previous iteration. PAPR measurement of the sum is followed by a decision process, which directs control to calculating a new sparse update matrix and repeating the aforementioned steps, or determining the best transmit signal (and/or corresponding data) determined from a plurality of iterations, which is then output for transmission. A corresponding pipeline architecture to perform this method is depicted in FIG. 9B. It should be appreciated that the pipeline can comprise fewer or more processors than the four processors 901-904 depicted here. An optional memory 910 can be provided, such as to store data for use in generating the sparse update matrix 901 and/or instructions for generating the sparse update matrix 901.

Since some processing operations disclosed herein (such as matrix multiplications) distribute across addition, it is not necessary for the pipeline to wait for a group to conclude processing before processing of the next group commences. For example, this allows group 2 to use the first processor 901 as soon as the first processor 901 concludes processing group 1. When the four processors 901-904 are processing at least four groups, this enables all four processors to be used concurrently. This is a specific improvement to the way computers operate. Specifically, this aspect is directed to a specific improvement to the function of a pipeline processor configuration.

In accordance with one aspect depicted in FIG. 9B, at the start of clock cycle 1, a first 911 of four processor functions 911-914 is to read data from memory 920 to begin processing group 1. This data might include a sparse update matrix, for example. The update matrix might comprise an update to an input data matrix, such as to provide for selective mapping order of the data symbols and/or change one or more data symbol values. Then, at the start of clock cycle 2, the first processor 911 reads the memory 920 for group 2 and the second processor 912 pre-codes the sparse update matrix for group 1. The sparse matrix might be adapted prior to pre-coding based on the data read from the memory 920. During clock cycle 3, the first processor 911 reads the data for group 3, the second processor 912 performs precoding on the sparse update matrix for group 2, and the third processor 913 performs the IFFT on the pre-coded values for group 1.

During clock cycle 4, the first processor 911 reads the memory 920 for group 4, the second processor 912 performs precoding on the sparse update matrix for group 3, the third processor 913 performs the IFFT on the pre-coded data for group 2, and the fourth processor 914 adds the IFFT output for group 1 to a base transmit signal.

It should be appreciated that an additional pipelined processor (not shown) might be employed to perform the PAPR measurement of the sum, and which may be subsequently stored in memory. In one aspect, an additional pipelined processor (not shown) performs the decision process. The decision process might include comparing the PAPR measurement to previous PAPR measurements stored in memory. In some aspects, the decision process might calculate a new sparse update matrix that is written to the memory and which is then read by the first processor to begin processing a new group.

Figure 9C:
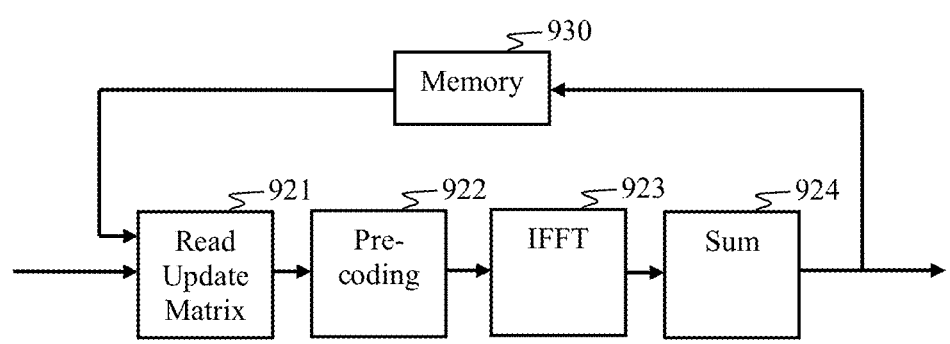

In another aspect, as depicted in FIG. 9C, at the start of clock cycle 1, a first 921 of four processor functions 921-924 is to read data from memory 930 to begin processing group 1. This data might include a sparse update pre-coding matrix, for example. A matrix of user data symbols and/or control data symbols may be read from the memory 930. Then, at the start of clock cycle 2, the first processor 921 reads the memory 930 for group 2 and the second processor 922 pre-codes the data symbols using the sparse update pre-coding matrix for group 1. The sparse update pre-coding matrix might be adapted prior to pre-coding based on the data read from the memory 930. During clock cycle 3, the first processor 921 reads the data for group 3, the second processor 922 performs the precoding using the sparse update pre-coding matrix for group 2, and the third processor 923 performs the IFFT on the pre-coded values for group 1. During clock cycle 4, the first processor 921 reads the memory 930 for group 4, the second processor 922 performs precoding for group 3, the third processor 923 performs the IFFT on the pre-coded data for group 2, and the fourth processor 924 adds the IFFT output for group 1 to a base transmit signal, such as an IFFT'd base-precoded data signal.

Pipeline-processing aspects disclosed herein can be used to update MIMO processing, such as transmitter MIMO processing and/or receiver MIMO processing described throughout this disclosure. Such aspects can exploit parallel and iterative aspects of the numerical techniques used to compute eigenvalues to achieve efficient parallel and/or pipeline processing architectures. Pipelined processing configurations can be built upon exploiting knowledge of an eigensystem of a previous state to approximate the eigensystem corresponding to an updated state. Any of the many disclosed techniques for reusing previous computations can be exploited to effect efficient pipelined processing. Algorithms for artificial neural networks can employ the disclosed efficient pipelined processing.

Figure 9D:
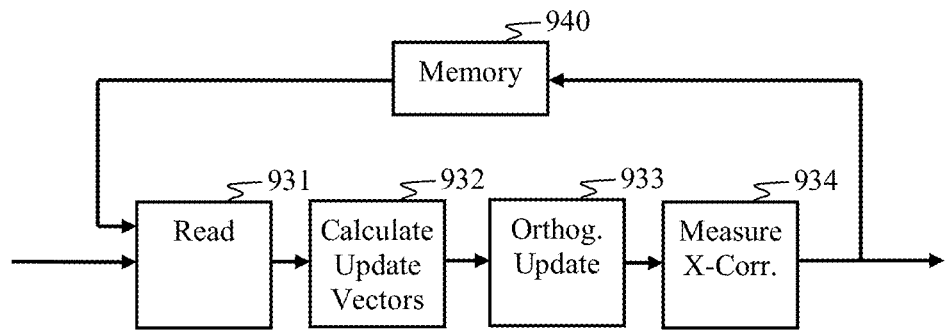

In one aspect, as depicted in FIG. 9D, at the start of clock cycle 1, a first 931 of four processor functions 931-934 is to read data from memory 940 to begin processing group 1. This data might include a sparse update to a base channel matrix. For example, an update to the channel matrix might comprise a row having non-zero values corresponding to a change in receiver parameters, such as a change to at least one receiver antenna or receiver beam pattern. Then, at the start of clock cycle 2, the first processor 931 reads the memory 940 for group 2 and the second processor 932 calculates sparse update vectors based on the sparse update to the base channel matrix for group 1. During clock cycle 3, the first processor 931 reads the data for group 3, the second processor 932 calculates sparse update vectors for group 2, and the third processor 933 updates channel matrix orthogonalization for group 1. During clock cycle 4, the first processor 931 reads the memory for group 4, the second processor 932 calculates sparse update vectors for group 3, the third processor 933 updates S-matrix orthogonalization for group 2, and the fourth processor 934 measures cross correlations of the updated channel matrix for group 1.

A decision process might be performed at the fourth processor 934 or thereafter based on the cross correlations. A result of the decision process might effect a new update to the receiver, resulting in a new sparse update to the base channel matrix that is stored in memory, and initiating a new group to be processed. If the cross correlations are below a predetermined threshold criterion or a maximum number of iterations is reached, the receiver parameters providing the lowest cross correlation may be selected.

Figure 9E:
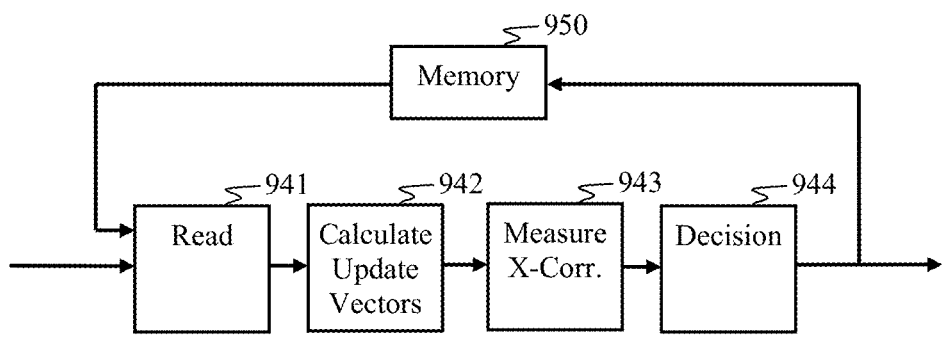

As depicted in FIG. 9E, in one aspect implemented in a MIMO base transceiver station (BTS), at the start of clock cycle 1, a first 941 of four processor functions 941-944 is to read data from memory 950 to begin processing group 1. This data might include a sparse update to a base channel matrix. A channel matrix might be measured by one or more clients of the BTS that provide feedback to the BTS. A channel matrix might be measured by the BTS when receiving transmissions in a reciprocal channel from the client(s). For example, an update to the channel matrix might comprise a column having non-zero values corresponding to a change in BTS transmitter parameters, such as a change to at least one transmit antenna or transmit beam pattern. Then, at the start of clock cycle 2, the first processor 941 reads the memory 950 for group 2 and the second processor 942 calculates sparse update vectors based on the sparse update to the base channel matrix for group 1. During clock cycle 3, the first processor 941 reads the data for group 3, the second processor 942 calculates sparse update vectors for group 2, and the third processor 943 effectively calculates cross correlations between at least some of the columns of the channel matrix for group 1. During clock cycle 4, the first processor 941 reads the memory 950 for group 4, the second processor 942 calculates sparse update vectors for group 3, the third processor 943 effectively calculates cross correlations between at least some of the columns of the channel matrix for group 2, and the fourth processor 944 performs decision processing based on the cross correlations for group 1. A result of the decision process 944 might effect a new update to the transmitter, resulting in a new sparse update to the base channel matrix that is stored in memory, and initiating a new group to be processed. If the cross correlations meet a predetermined threshold criterion or a maximum number of iterations is reached, the BTS transmitter parameters providing the lowest cross correlation may be selected.

It should be appreciated that processors disclosed herein (such as the third processor 943) configured to effectively calculate (or otherwise evaluate) cross correlations might calculate or evaluate fewer than the total number of possible cross correlations, such as to provide improved processing efficiency. In some aspects, for example, the third processor 943 might calculate cross correlations related only to the column vector(s) that changes. In some instances, cross correlations (or changes in cross correlation) relative to a subset of the column vectors (such as column vectors that previously had correlations above a predetermined threshold) are calculated or otherwise evaluated. For example, the processor(s) might calculate or otherwise evaluate cross correlation (or change in cross correlation) between the updated column vector(s) and one or two column vectors (or some other number that is fewer than the total number of remaining column vectors) that were previously highly correlated with the updated column vector(s) previous to its (their) most recent update. In some aspects, the third processor 943 calculates the change in cross correlation(s) resulting from each update. For example, the third processor 943 might calculate (or otherwise evaluate) cross correlations between an update vector and other vectors in an S matrix, channel matrix, or covariance matrix.

The various blocks shown in the figures may be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the invention may be practiced in various components such as integrated circuit chips and modules, and that the exemplary aspects of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary aspects of this invention.

Various modifications and adaptations to the foregoing exemplary aspects of this invention may become apparent to those skilled in the relevant arts in view of the foregoing description, when read in conjunction with the accompanying drawings. However, any and all modifications will still fall within the scope of the non-limiting and exemplary aspects of this invention.

The invention claimed is:

1. An apparatus, comprising:
at least one processor; and
at least one memory in electronic communication with the at least one processor, and instructions stored in the at least one memory, the instructions executable by the at least one processor for;
computing eigenvalues of an eigensystem of a first data set, the first data set comprising first radio signal measurements;
computing updated eigenvalues that approximate an eigensystem of at least a second data set based on the eigensystem of the first data set, the at least second data set comprising at least second radio signal measurements;
evaluating a plurality of features in each of the first and at least second data sets using a cost function; and reducing computational processing of the at least one computer processor by at least one of selecting the cost function to comprise fewer than a total number of eigenvalues in at least one eigensystem and employing a coarse approximation of eigenvalues to de-select at least one of the first and at least second data sets.

2. The apparatus of claim 1, wherein the at least one memory stores instructions for calculating a gradient of the cost function to effect backpropagation.

3. The apparatus of claim 1, wherein the at least one memory stores instructions for determining which of the plurality of features correlates with a performance metric that is a function of eigenvalues.

4. The apparatus of claim 1, wherein the at least one memory stores instructions for grouping ones of the plurality of features that correspond with a similar performance metric, the performance metric being a function of eigenvalues.

5. The apparatus of claim 1, wherein the at least one memory stores instructions for detecting at least one of the plurality of features in an input data set, developing a hypothesis based on at least a detected one of the plurality of features, determining an error value between the hypothesis and a performance metric computed from eigenvalues of an eigensystem corresponding to the input data set.

6. The apparatus of claim 1, wherein the at least one memory stores instructions for developing a hypothesis based on at least one feature of an input data set, and updating the input data set based on the hypothesis.

7. The apparatus of claim 6, wherein the updating is performed via antenna selection.

8. A computer program product, comprising a non-transitory computer readable hardware storage device having computer readable program code stored therein, the program code containing instructions executable by one or more processors of a computer system for:
   computing eigenvalues of an eigensystem of a first data set, the first data set comprising first radio signal measurements;
   computing updated eigenvalues that approximate an eigensystem of at least a second data set based on the eigensystem of the first data set, the at least second data set comprising at least second radio signal measurements;
   evaluating a plurality of features in each of the first and at least second data sets using a cost function; and
   reducing computational processing of the at least one computer processor by at least one of selecting the cost function to comprise fewer than a total number of eigenvalues in at least one eigensystem and employing a coarse approximation of eigenvalues to de-select at least one of the first and at least second data sets.

9. The computer program product of claim 8, wherein the program code contains instructions executable by the one or more processors of the computer system for calculating a gradient of the cost function to effect backpropagation.

10. The computer program product of claim 8, wherein the program code contains instructions executable by the one or more processors of the computer system for determining which of the plurality of features correlates with a performance metric that is a function of eigenvalues.

11. The computer program product of claim 8, wherein the program code contains instructions executable by the one or more processors of the computer system for grouping ones of the plurality of features that correspond with a similar performance metric, the performance metric being a function of eigenvalues.

12. The computer program product of claim 8, wherein the program code contains instructions executable by the one or more processors of the computer system for detecting at least one of the plurality of features in an input data set, developing a hypothesis based on at least a detected one of the plurality of features, determining an error value between the hypothesis and a performance metric computed from eigenvalues of an eigensystem corresponding to the input data set.

13. The computer program product of claim 8, wherein the program code contains instructions executable by the one or more processors of the computer system for developing a hypothesis based on at least one feature of an input data set, and updating the input data set based on the hypothesis.

14. The computer program product of claim 13, wherein updating is performed via antenna selection.

15. An apparatus, comprising:
   a radio receiver configured to produce first radio signal measurements and at least second radio signal measurements;
   at least one processor; and
   at least one memory in electronic communication with the at least one processor, and instructions stored in the at least one memory, the instructions executable by the at least one processor for:
      computing eigenvalues of an eigensystem of a first data set, the first data set comprising first radio signal measurements;
      computing updated eigenvalues that approximate an eigensystem of at least a second data set based on the eigensystem of the first data set, the at least second data set comprising at least second radio signal measurements;
      evaluating a plurality of features in each of the first and at least second data sets using a cost function; and
      reducing computational processing of the at least one computer processor by at least one of selecting the cost function to comprise fewer than a total number of eigenvalues in at least one eigensystem and employing a coarse approximation of eigenvalues to de-select at least one of the first and at least second data sets.

16. The apparatus of claim 15, wherein the at least one memory stores instructions for calculating a gradient of the cost function to effect backpropagation.

17. The apparatus of claim 15, wherein the at least one memory stores instructions for determining which of the plurality of features correlates with a performance metric that is a function of eigenvalues.

18. The apparatus of claim 15, wherein the at least one memory stores instructions for grouping ones of the plurality of features that correspond with a similar performance metric, the performance metric being a function of eigenvalues.

19. The apparatus of claim 15, wherein the at least one memory stores instructions for detecting at least one of the plurality of features in an input data set, developing a hypothesis based on at least a detected one of the plurality of features, determining an error value between the hypothesis and a performance metric computed from eigenvalues of an eigensystem corresponding to the input data set.

20. The apparatus of claim 15, wherein the at least one memory stores instructions for developing a hypothesis based on at least one feature of an input data set, and updating the input data set based on the hypothesis.

21. The apparatus of claim 20, wherein the updating is performed via antenna selection.

\* \* \* \* \*